(12) United States Patent
Shah

(10) Patent No.: US 11,586,414 B2
(45) Date of Patent: *Feb. 21, 2023

(54) ALTERING COMMUNICATIONS CAPTURED BY AN INCIDENT RECORDING DEVICE

(71) Applicant: Axon Enterprise, Inc., Scottsdale, AZ (US)

(72) Inventor: Kevin Shah, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,039

(22) Filed: Aug. 2, 2021

(65) Prior Publication Data

US 2021/0365236 A1 Nov. 25, 2021

Related U.S. Application Data

(63) Continuation of application No. 16/863,992, filed on Apr. 30, 2020, now Pat. No. 11,080,009.

(60) Provisional application No. 62/840,591, filed on Apr. 30, 2019.

(51) Int. Cl.
*H04R 5/04* (2006.01)
*G06F 3/16* (2006.01)

(52) U.S. Cl.
CPC ............ *G06F 3/165* (2013.01); *H04R 5/04* (2013.01); *H04R 2420/07* (2013.01)

(58) Field of Classification Search
CPC ....... G06F 3/165; H04R 5/04; H04R 2420/07; H04R 21/4334; H04N 7/181; H04N 7/188

USPC .......................................................... 700/94
See application file for complete search history.

(56) References Cited

U.S. PATENT DOCUMENTS

| | | | |
|---|---|---|---|
| 2009/0273682 A1* | 11/2009 | Shekarri | H04N 5/77 704/275 |
| 2010/0195812 A1 | 8/2010 | Florencio et al. | |
| 2016/0182850 A1 | 6/2016 | Thompson | |
| 2016/0241807 A1 | 8/2016 | Kovac | |
| 2018/0122390 A1 | 5/2018 | Hong et al. | |
| 2019/0020905 A1* | 1/2019 | Bennett | H04N 5/77 |
| 2019/0155833 A1 | 5/2019 | Flowerday et al. | |
| 2019/0356934 A1* | 11/2019 | MacDonald | H04N 21/2365 |

FOREIGN PATENT DOCUMENTS

EP          3913591 A1 * 11/2021 ......... G06F 21/6245

* cited by examiner

*Primary Examiner* — Melur Ramakrishnaiah
(74) *Attorney, Agent, or Firm* — Andrew Graham

(57) ABSTRACT

Systems and methods for altering communications captured by an incident recording device are provided. An incident recording may be captured by a recording device. The incident recording may comprise audio data. A communication activation signal may be detected by the recording device. The communication activation signal may be followed by communication audio data and the communication audio data may be captured in the audio data. Based on detecting the communication activation signal, the recording device may alter the audio data of the incident recording to at least partially alter the communication audio data captured in the audio data.

25 Claims, 6 Drawing Sheets

ALTERING COMMUNICATIONS CAPTURED BY AN INCIDENT RECORDING DEVICE

CROSS-REFERENCE TO RELATED APPLICATIONS

This application is a continuation of U.S. application Ser. No. 16/863,992, filed Apr. 30, 2020, which claims priority to, and the benefit of, U.S. Provisional Patent Application No. 62/840,591, filed on Apr. 30, 2019, and entitled "SELECTABLE DYNAMIC CHANNELS BETWEEN MULTIMEDIA DEVICES CONFIGURED TO CAPTURE LOCAL INCIDENT EVENTS," each of which are herein incorporated by reference in their entirety.

FIELD

Embodiments of the present disclosure relate to systems for altering communications captured by an incident recording device.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
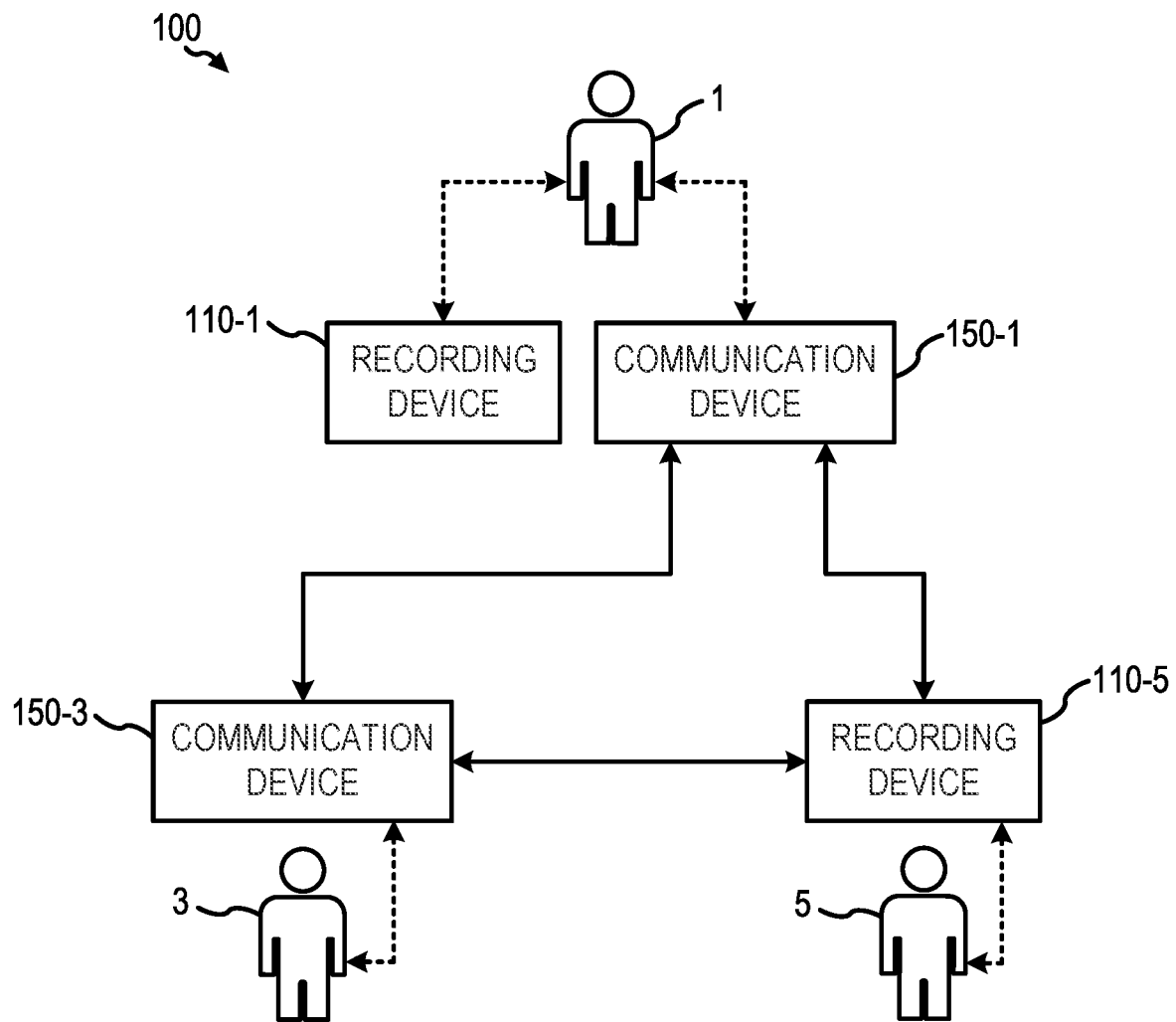
FIG. 1 is a block diagram illustrating components of a system for altering communications captured by an incident recording device, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of various embodiments refers to the accompanying drawings, which show various embodiments by way of illustration. While these various embodiments are described in sufficient detail to enable those skilled in the art to practice the disclosure, it should be understood that other embodiments may be realized, and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As discussed herein, an incident (or similar terms and phrases, such as an emergency) refers to human or animal activities and to a period of time while these activities take place. Incidents include, for example, formation of agreements, transactions, negotiations, discussions, ceremonies, meetings, medical procedures, sporting events, crimes, attempted crimes, disagreements, assaults, conflicts, discoveries, research, investigations, surveillance, and/or the like. Incidents may include consequences including changes to property such as improvements, repairs, construction, production, manufacture, growth, harvesting, damage, loss, theft, burglary, arson, goods damaged in shipment, conditions of real estate, and/or conditions of agricultural and forestry property. An incident may include damage to property and/or injury to persons or animals. Damage to property or injury to persons or animals may be accidental or brought on by the action or failure to act of one or more persons. Incidents include information valuable for risk management, insurance, claims, achievements, sports records, news reporting, entertainment, and/or the like.

Information (e.g., data, audio, visual, location, environmental, etc.) gathered about an incident may describe the incident. Information may include facts about the activities of the incident, consequences of the incident, time of the incident, location of the incident, and identity of humans, animals, or objects related to the incident. Information about an incident may form a report of an incident (e.g., an incident report). Information about the incident may be gathered before, during, or after an incident. Incident information may be recorded (e.g., audio, video) to document an incident at the time of occurrence. Recording incident information captures at least some of the information about the incident. Recording further protects against loss of information, for example, by physical loss or by faulty human memory. For example, incident responders may capture audio and/or visual information of the incident. The audio and/or visual information may be captured by an incident recording device, such as, for example, a body-worn camera, a smart phone or internet of things (IoT) device, a vehicle-mounted camera, a surveillance camera, and/or any other recording device discussed herein.

One or more incident responders may respond or help before, during, or after an incident. For example, in response to an incident including a fire (e.g., burning building, house fire, etc.), incident responders may typically include a law enforcement officer, a firefighter, a medical responder (e.g., an emergency medical technician (EMT), a paramedic, an ambulance technician, etc.). As a further example, in response to an incident including a crime or attempted crime, incident responders may include one or more law enforcement officers.

During an incident, or before or after the incident, incident responders may desire to open a communication channel between the incident responders. The communication channel may enable the incident responders to communicate regarding the incident. The communication channel may enable the incident responders to communicate at a distance regarding the incident. The communication channel may provide audio, video, and/or audio-visual capabilities. The communication channel may be a unified channel, a private channel, a public channel, or any other suitable channel. The communication channel may enable two-way communications between incident responders wherein each incident responder may receive and transmit communications. A two-way communication, as discussed herein, may include push-to-talk ("PTT") communications, and/or any other suitable or desired type of two-way communication.

In various embodiments, a plurality of incident responders may have communication devices configured to enable the two-way communications. As discussed further herein, the communication device may comprise a standalone device configured to enable two-way communications. As discussed further herein, the communication device may be integrated into the recording device.

In response to an incident responder capturing audio and/or audio-visual information of an incident while also communicating during a two-way communication, audio data of the two-way communication may be captured together with the recorded data for the incident. Incident responders may desire to provide audio data for two-way communications that does not become part of the recorded data for an incident.

In various embodiments, and with reference to FIG. 1, a system 100 for altering communications (e.g., two-way communications) captured by a recording device (e.g., an incident recording device) is disclosed.

System 100 may include one or more users in communication with, or desired to be in communication with, each other, such as, for example, a first user 1, a second user 3, a third user 5, and/or any other suitable number of users. In various embodiments, any user described herein may be an incident responder. An incident responder may include an individual, or group of individuals, that performs incident services. For example, an incident responder may be a law enforcement officer, a firefighter, an emergency medical technician (EMT), a paramedic, an ambulance technician, an animal control officer, a utility service personnel, and/or the like. The incident responder may be a government employee or a private employee (e.g., a security guard).

In various embodiments, one or more users 1, 3, 5 may have one or more devices configured to enable communications between the users. In various embodiments, one or more users may be proximate a user having a device configured to enable communications (e.g., a first user may be physically proximate a second user having a communication device such that the first user and the second user may communicate via the same communication device).

As an example, and in accordance with various embodiments, first user 1 may have a first recording device 110-1 and a first communication device 150-1, second user 3 may have a second communication device 150-3, and/or third user 5 may have a second recording device 110-5.

Figure 2A:
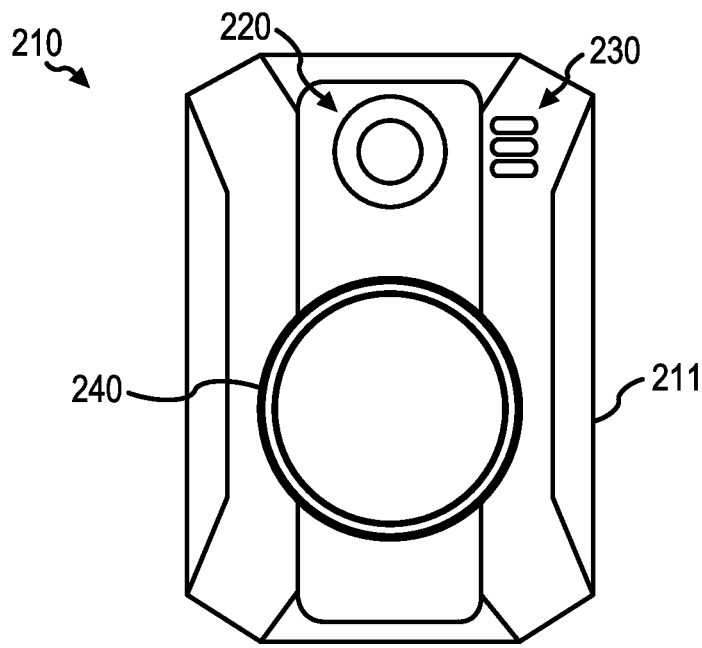
FIG. 2A is a front view of an exemplary incident recording device, in accordance with various embodiments.
Figure 2B:
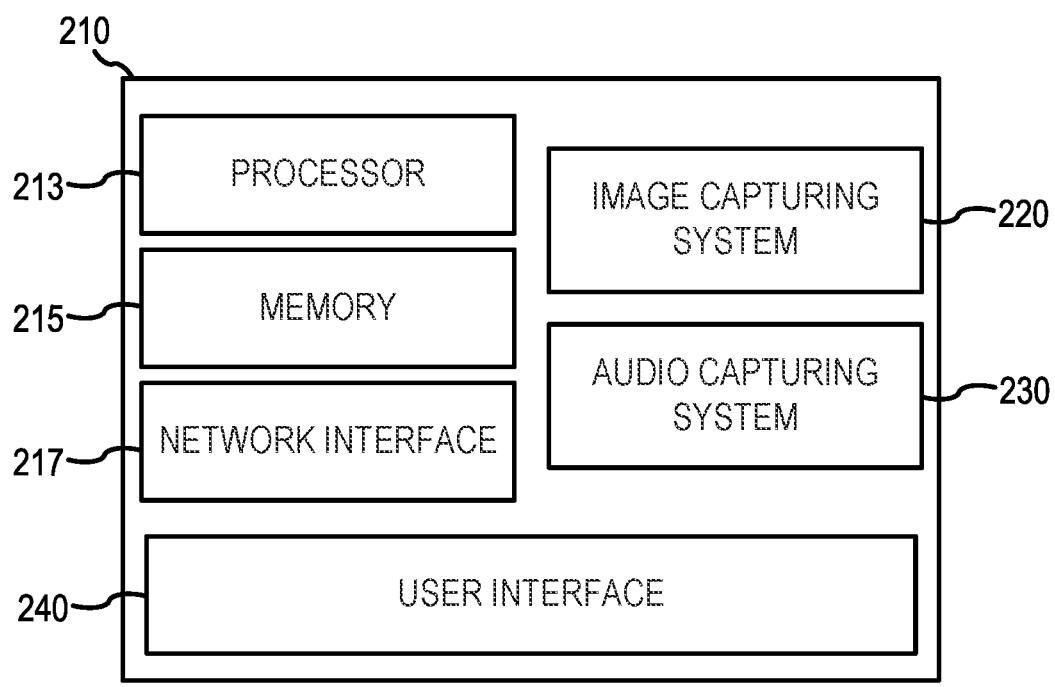
FIG. 2B is a block diagram of an exemplary incident recording device, in accordance with various embodiments.

In various embodiments, and with reference to FIGS. 2A and 2B, an exemplary recording device 210 is disclosed. Although depicted in FIG. 2A as a body-worn camera, recording device 210 may comprise any suitable device, computer-based system, camera, vehicle-mounted camera, surveillance camera, and/or the like configured to capture audio, images, and/or audio-visual data. In embodiments, recording device 210 may correspond to recording device 110-1 with brief reference to FIG. 1.

With specific reference to FIG. 2A, and in accordance with various embodiments, recording device 210 may comprise one or more of a body 211, an image capturing system 220, an audio capturing system 230, and/or a user interface 240. Body 211 may comprise mechanical features configured to couple recording device 210 to a surface. For example, body 211 may be configured to couple to clothing of a user. In other embodiments, body 211 may be configured to mount on a vehicle or similar platform. Body 211 may be configured to house (fully and/or at least partially) various mechanical, electrical, and/or electronic components configured to aid in performing the functions of recording device 210. For example, body 211 may be configured to house one or more components depicted in FIG. 2B. With specific reference to FIG. 2B, and in accordance with various embodiments, recording device 210 may comprise one or more of a processor 213, a memory 215, a network interface 217, image capturing system 220, audio capturing system 230, and/or user interface 240.

In various embodiments, processor 213 may comprise any circuitry, electrical components, electronic components, software, and/or the like configured to perform various operations and functions discussed herein. For example, processor 213 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processor 213 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 213 may include data buses, output ports, input ports, timers, memory, arithmetic units, and/or the like.

Processor 213 may be configured to provide and/or receive electrical signals whether digital and/or analog in form. Processor 213 may provide and/or receive digital information via a data bus using any protocol. Processor 213 may receive information, manipulate the received information, and provide the manipulated information. Processor 213 may record (e.g., buffer, store, etc.) information and retrieve recorded information. Information received, recorded, and/or manipulated by processor 213 may be used to perform a function, control a function, and/or to perform an operation or execute a stored program.

Processor 213 may control the operation and/or function of other circuits and/or components of recording device 210. Processor 213 may receive status information regarding the operation of other components, perform calculations with respect to the status information, and provide commands (e.g., instructions) to one or more other components. Processor 213 may command another component to start operation, continue operation, alter operation, suspend operation, cease operation, or the like. Commands and/or status may be communicated between processor 213 and other circuits and/or components via any type of bus (e.g., serial peripheral interface (SPI) bus) including any type of data/address bus.

In various embodiments, processor 213 may be in electrical and/or electronic communication with memory 215, network interface 217, image capturing system 220, and/or audio capturing system 230. Processor 213 may be in electrical, electronic, and/or mechanical communication with user interface 240.

In various embodiments, memory 215 may comprise one or more memory, data structures, or the like configured to store data, programs, and/or instructions. Memory 215 may be in electrical and/or electronic communication with processor 213, network interface 217, image capturing system 220, and/or audio capturing system 230.

In an embodiment, memory 215 may comprise a tangible, non-transitory computer-readable memory. Instructions stored on the tangible non-transitory memory may allow processor 213 to perform various operations, functions, and/or steps, as described herein. For example, in response to processor 213 executing the instructions on the tangible non-transitory memory, processor 213 may communicate with image capturing system 220 and/or audio capturing system 230 to capture image and/or audio data, alter captured communication audio data, cease altering captured communication audio data, end capturing of the image and/or audio data, and/or the like, as discussed further herein. Processor 213 may execute the instructions in response to operation of user interface 240, as discussed further herein. In embodiments, memory 215 may also be configured to receive, record, and maintain incident recordings, including captured image and audio data. In that regard, memory 215 may include a storage medium, data structure, database, memory unit, hard-disk drive (HDD), solid state drive (SSD), removable memory, and/or the like.

In various embodiments, network interface 217 may be configured to enable the transmission and/or reception of data between recording device 210 and one or more additional devices, servers, networks, or the like. Network interface 217 may be in electric and/or electronic communication with processor 213 and/or memory 215. Network interface 217 may comprise one or more suitable hardware and/or software components capable of enabling the transmission and/or reception of data, such as, for example, a communications unit, as discussed further herein. In various embodiments, network interface 217 may receive data associated with one or more of a communication activation signal and a communication ending signal as further described herein.

In various embodiments, image capturing system 220 may be configured to capture an image or series of images (e.g., video). For example, during an incident recording image capturing system 220 may be configured to capture images and/or video of the incident recording. Image capturing system 220 may comprise various hardware and/or software components configured to capture images and/or video. For example, image capturing system 220 may comprise one or more cameras configured to capture images and/or video. Image capturing system 220 may be in electric and/or electronic communication with processor 213 and/or memory 215. Processor 213 may control (e.g., instruct) image capturing system 220 to begin capturing images and to end capturing of the images. Processor 213 may also control (e.g., instruct) image capturing system 220 to transmit the captured images to memory 215 for buffering and/or storage. Image capturing system 220 may transmit (e.g., stream) the captured images to memory 215 as the images are captured or in response to image capturing system 220 ending capturing of the images.

In various embodiments, audio capturing system 230 may be configured to capture audio. For example, during an incident recording audio capturing system 230 may be configured to capture audio data of the incident recording. Audio capturing system 230 may comprise various hardware and/or software components configured to capture audio. For example, audio capturing system 230 may comprise one or more microphones configured to capture audio. Audio capturing system 230 may be in electric and/or electronic communication with processor 213 and/or memory 215. Processor 213 may control (e.g., instruct) audio capturing system 230 to begin capturing audio and to end capturing of the audio. Processor 213 may also control (e.g., instruct) audio capturing system 230 to transmit the captured audio to memory 215 for storage. Audio capturing system 230 may transmit (e.g., stream) the captured audio to memory 215 as the audio is captured or in response to audio capturing system 230 ending capturing of the audio.

In various embodiments, user interface 240 may be configured to enable a user to interact with recording device 210. For example, user interface 240 may be configured to enable the user to control operation of recording device 210, including starting and stopping audio and/or image recording. User interface 240 may be in electrical, electronic, and/or mechanical communication with processor 213.

User interface 240 may comprise any suitable hardware, software, mechanical, and/or electronic components configured to enable the user interaction. For example, and in accordance with various embodiments, user interface 240 may comprise a button, switch, or the like. In that regard, user interface 240 may be configured to move, slide, rotate, or otherwise become physically depressed or moved upon application of physical contact. As a further example, and in accordance with various embodiments, user interface 240 may comprise a touchscreen or similar interface enabling user input. As a further example, and in accordance with various embodiments, user interface 240 may include voice control technology. In that regard, user interface 240 may at least partially integrate with audio capturing system 230 to receive voice commands (e.g., "Record", "Stop Record", "Capture Image", "Record Audio", etc.). Voice command technology is well known in the art, and user interface 240 may implement any suitable voice command technology.

In various embodiments, in response to user interface 240 being activated (e.g., physically activated, voice activated, touch-screen selection, etc.), processor 213 may be configured to perform various operations including starting and/or stopping an incident recording, controlling operation of image capturing system 220, controlling operation of audio capturing system 230, and/or the like, as discussed further herein.

In various embodiments, user interface 240 may include an authorization control configured to control access and operation of recording device 210. For example, user interface 240 may comprise a biometric authorization control, such as a fingerprint reader, configured to control access and operation of recording device 210.

Figure 3:
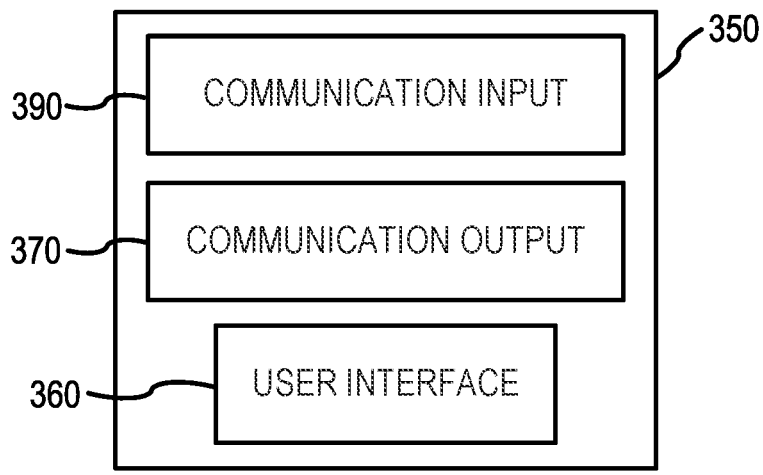
FIG. 3 is a block diagram of an exemplary communication device, in accordance with various embodiments.

In various embodiments, and with reference to FIG. 3, an exemplary communication device 350 is disclosed. Communication device 350 may be configured to enable communications between users via a communications channel. The communications channel may be private or public. The enabled communications may include push-to-talk (PTT) communications, one-way communications, two-way communications, duplex communications, half-duplex communications, and/or the like. The communications channel may include a telecommunications network (e.g., a telephonic communication). The telecommunications network may include a public switched telephone network (PSTN), a cellular network or mobile network, a private telephone network (e.g., a private branch exchange (PBX)), an integrated services digital network (ISDN), and/or the like. In embodiments, communication device 350 may correspond to communication device 150-1 and/or 150-3 with brief reference to FIG. 1.

Communication device 350 may comprise any combination of hardware and/or software components. For example, communication device 350 may comprise hardware such as a processor or processing unit, a system memory, a storage medium, a network interface or communications unit, and/or the like. Communication device 350 may also comprise software configured to manage and/or interact with the hardware components, such as, for example, an operating system, user interfaces, software applications, and/or the like. In various embodiments, communication device 350 may comprise a telecommunications device such as, for example, a mobile telephone, a cellular telephone, a smart telephone (e.g., IPHONE®, ANDROID®, etc.), a radio, and/or the like. In various embodiments, communication device 350 may be a computing device such as a computer-based system, a portable computer-based system (e.g., a laptop, a notebook, a hand held computer, a tablet, a personal digital assistant, etc.), a smart telephone, a wearable device (e.g., a smart watch, smart glasses, etc.), an internet of things (IoT) device, and/or any other device capable of transmitting and/or receiving data.

In various embodiments, communications transmitted between communication devices may each include a communication activation signal, communication audio data, and a communication ending signal.

The communication activation signal may signal to each communication device and/or recording device that communication audio data is about to be received and/or output. The communication activation signal is configured to be output by the communication device receiving the communication audio data. The communication activation signal may comprise one or more of a wireless transmission, a voice command, an activation sound, or a user interface activation. The wireless transmission may comprise a wirelessly transmitted signal, such as, for example, a Bluetooth® Low Energy (LE) signal output by a Bluetooth® beacon. The wireless transmission may be configured to be recognizable as a communication activation signal, such as, for example, by including data indicating to communication devices and/or recording devices that the wireless transmission is a communication activation signal. The voice command may be speech from the user preceding the communication audio data and configured to be recognizable as a communication activation signal. For example, a voice command may include "Begin Audio", "Breaker", "Start", and/or the like. The activation sound may comprise a push-to-talk activation sound such as, for example, a squelch, a beep, a short sound, a high-pitched sound, or the like. The activation sound may be configured to be recognizable by other communication devices and/or recording devices as a communication activation signal. The user interface activation may include an activation of a user interface by a user to begin output of the communication audio data, as discussed further herein.

In various embodiments, the communication activation signal may include a data packet. The data packet may include data indicating privacy settings of the communication, such as, for example, whether the communication audio data is transmitted over a private channel or a public channel. In that regard, the data packet may comprise a binary value indicating the channel (e.g., public channel is assigned 0, privacy channel is assigned 1, etc.).

The communication ending signal may signal to each communication device and/or recording device that the communication audio data has ended. The communication ending signal is configured to be output by the communication device receiving the communication audio data. The communication ending signal may comprise one or more of a wireless transmission, a voice command, an activation sound, or a user interface activation. The wireless transmission may comprise a wirelessly transmitted signal, such as, for example, a Bluetooth® (LE) signal output by a Bluetooth® beacon. The wireless transmission may be configured to be recognizable as a communication ending signal, such as, for example, by including data indicating to communication devices and/or recording devices that the wireless transmission is a communication ending signal. The voice command may be speech from the user proceeding the communication audio data and configured to be recognizable as a communication ending signal. For example, a voice command may include "End Audio", "Breaker", "End", "Over", and/or the like. The activation sound may comprise a push-to-talk activation sound such as, for example, a squelch, a beep, a short sound, a high-pitched sound, or the like. The activation sound may be configured to be recognizable by other communication devices and/or recording devices as a communication ending signal. The user interface activation may include an activation of a user interface by a user to end output of the communication audio data, as discussed further herein.

In various embodiments, communication device 350 may comprise one or more of a user interface 360, a communication output 370, and a communication input 390.

Communication output 370 may be configured to output audio and/or signal data. For example, communication output 370 may be configured to output the communication activation signal, the communication audio data, and/or the communication ending signal, as discussed further herein. Communication output 370 may comprise one or more components (e.g., hardware, software, etc.) configured to generate and/or output audio such as, for example, audio processing and/or generating components (e.g., discrete soundcards, integrated soundcards, processors, processing circuits, integrated circuits, amplifier, etc.), audio output components (e.g., speakers), and/or the like. In response to the communication activation signal and/or the communication ending signal comprising a non-audio signal, communication output 370 may also comprise one or more components configured to generate and/or output signals, such as for example signal generating components (e.g., Bluetooth® beacon, etc.), wireless transmission components (e.g., wireless network interface), a network interface, and/or the like.

Communication input 390 may be configured to ingest audio inputs. For example, communication input 390 may be configured to ingest communication audio data from a user. In various embodiments wherein a communication activation signal and/or a communication ending signal are voice commands, communication input 390 may be configured to ingest the communication activation signal and/or the communication ending signal. Communication input 390 may comprise one or more components (e.g., hardware, software, etc.) configured to ingest audio such as, for example, audio processing components (e.g., discrete soundcards, integrated soundcards, processors, processing circuits, integrated circuits, amplifier, etc.), audio input components (e.g., microphones), and/or the like.

In various embodiments, communication input 390 may be similar to audio capturing system 230, with brief reference to FIG. 2.

User interface 360 may be configured to control user operation of communication device 350. For example, user interface 360 may enable a user to control the ingestion and transmission of audio, including communication audio data, the volume of audio output, and/or the like. In various embodiments, user interface 360 may also enable a user to select between communication channels (e.g., "private", "public", etc. or "1", "2", "3", etc.). In various embodiments, in a push-to-talk implementation, user interface 360 may control the transmission of the communication audio data. For example, in response to user interface 360 receiving a first input, communication device 350 may begin capturing audio (e.g., via communication input 390) and may transmit the audio to other communication devices in the communication channel. In response to user interface 360 receiving a second input, communication device 350 may end capturing audio (e.g., via communication input 390) and may cease transmitting the audio to other communication devices in the communication channel.

User interface 360 may be similar to user interface 240, with brief reference to FIG. 2B. User interface 360 may comprise any suitable hardware, software, mechanical, and/or electronic components configured to enable the user interaction. For example, and in accordance with various embodiments, user interface 360 may comprise a button, switch, or the like. In that regard, user interface 360 may be configured to move, slide, rotate, or otherwise become physically depressed or moved upon application of physical contact. As a further example, and in accordance with various embodiments, user interface 360 may comprise a touchscreen or similar interface enabling user input.

In various embodiments, a communication activation signal may comprise an input received via one or more of communication input 390 and user interface 360. For example, a first communication activation signal may comprise predetermined audio received via a microphone of communication input 390. The predetermined audio may comprise one of a voice command and an activation sound. A second communication activation signal may comprise actuation of a button of user interface 360. As a further example, a third communication activation signal may comprise a wireless transmission received via a wireless transmission component of communication input 390.

In various embodiments, a communication ending signal may comprise an input received via one or more of communication input 390 and user interface 360. For example, a first communication ending signal may comprise predetermined audio received via a microphone of communication input 390. The predetermined audio may comprise one of a voice command and an activation sound. A second communication ending signal may comprise actuation of a button of user interface 360. As a further example, a third communication ending signal may comprise a wireless transmission received via a wireless transmission component of communication input 390.

In various embodiments, communication device 350 may be configured to relay a communication activation signal to a nearby recording device. The relayed communication activation signal may provide indication that the communication device 350 is configured to receive and transmit audio, including communication audio. Communication device 350 may receive a first communication activation signal via one of communication input 390 and user interface 360 and, in accordance with the first communication ending signal, transmit a second communication activation signal via communication output 370. For example, the first communication activation signal may comprise an input received via a button of user interface 360 and the second communication activation signal may comprise audio generated via a speaker of communication output 370. As a further example, the first communication activation signal may comprise an input (e.g., voice command, activation sound) received via a microphone of user interface 360 and the second communication activation signal may comprise a wireless transmission generated via a wireless transmission component of communication output 370. Communication device 350 may be enabled to receive and transmit communication audio data after a time at which the first communication activation signal is received and the second communication ending signal is transmitted.

In various embodiments, and similar to the communication activation signal, communication device 350 may be configured to relay a communication ending signal to a nearby recording device. The relayed communication ending signal may provide indication that the communication device 350 is not configured (e.g., disabled, stopped, prevented, etc.) to receive and transmit audio, including communication audio. Communication device 350 may receive a first communication ending signal via one of communication input 390 and user interface 360 and, in accordance with the first communication ending signal, transmit a second communication ending signal via communication output 370. For example, the first communication ending signal may comprise an input received via a button of user interface 360 and the second communication ending signal may comprise audio generated via a speaker of communication output 370. As a further example, the first communication ending signal may comprise an input (e.g., voice command, activation sound) received via a microphone of user interface 360 and the second communication ending signal may comprise a wireless transmission generated via a wireless transmission component of communication output 370. Receipt and transmission of communication audio data may be discontinued (e.g., ended, ceased, terminated, etc.) at a time at which the first communication ending signal is received and prior to transmission of the second communication ending signal.

In various embodiments, at least one of the second communication activation signal and the second communication ending signal may be received and output separately from any communication audio data received and output by communication device 350. The second communication ending signal and second communication ending signal may be received and output via one or more of a different channel, a different communication medium, and a different output component of communication output 370 relative to the communication audio data. The second communication activation signal and the second communication ending signal may be associated with the communication audio data, yet propagated distinctly from the communication audio data. In embodiments, and after a first communication activation signal is received, the communication audio data may be received via a component of communication output 370 that is distinct from another component of communication output 370 by which the second communication activation signal is transmitted. For example, the second communication activation signal may be output via a loudspeaker or a wireless personal area network component of communication output 370 and the subsequently received communication audio data may be transmitted via a wireless wide area network component of communication output 370. In various embodiments, the second communication activation signal and the second communication ending signal may be directed to (e.g., configured for receipt by) a nearby recording device, while the communication audio data may be directed to a remote communication device. The nearby recording device may directly receive the second communication activation signal and the second communication ending signal, while the remote communication device may receive the communication audio data indirectly via a communication network.

In various embodiments, a same component of user interface 360 may enable multiple user interactions. For example, and in accordance with various embodiments, a communication activation signal may comprise a first input received via a button of user interface 360 and a communication ending signal may comprise a second input received via the button of user interface 360. The first input may comprise a first actuation (e.g., engagement, depression, movement in a forward direction, etc.) of the button while the second input may comprise a second actuation (e.g., disengagement, release, movement in a reverse direction, etc.) of the button. As a related example, and in accordance with various embodiments, the first input may comprise a first predetermined audio received via a microphone of communication input 390 and the second input may comprise a second predetermined audio received via the microphone.

Figure 4:
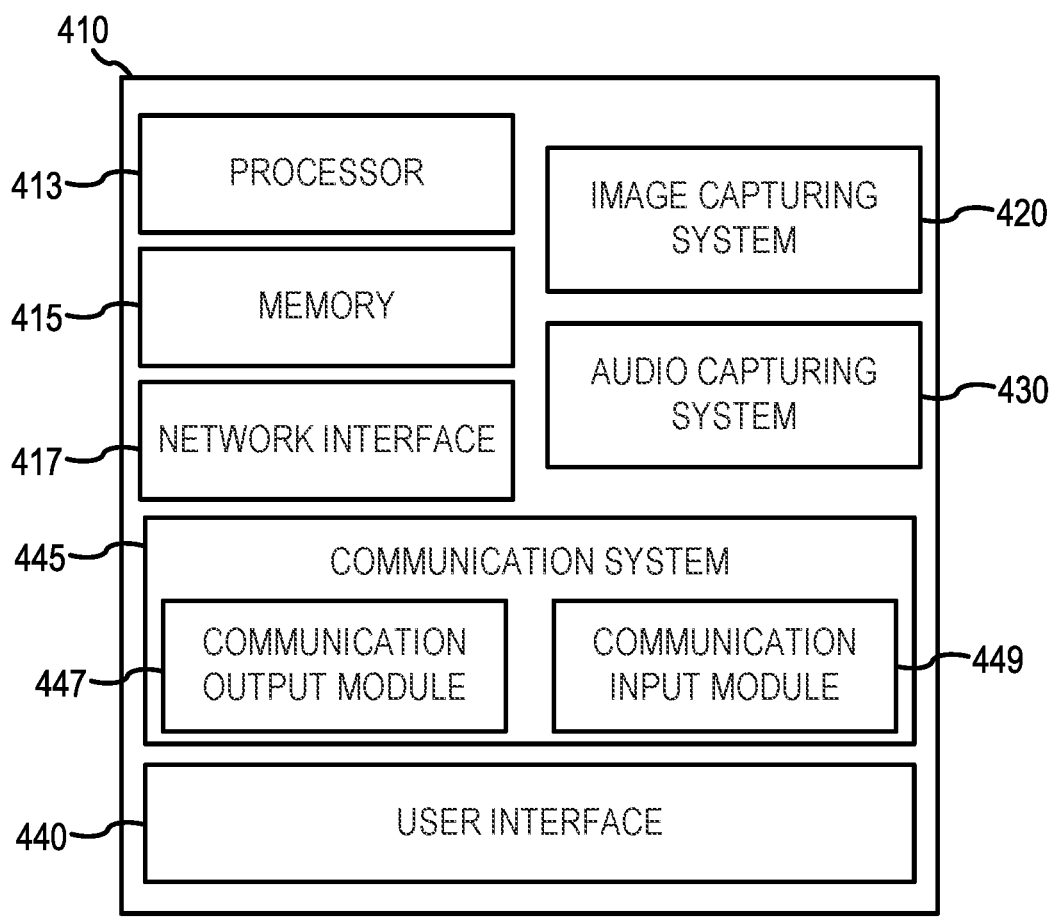
FIG. 4 is a block diagram of an exemplary recording device having communication components, in accordance with various embodiments.

In various embodiments, and with reference to FIG. 4, an exemplary recording device 410 comprising a communication system 445 is disclosed. Recording device 410 may comprise one or more similar components and functions as recording device 210, with brief reference to FIGS. 2A and 2B. In various embodiments, recording device 410 may comprise a processor 413, a memory 415, a network interface 417, an image capturing system 420, an audio capturing system 430, a user interface 440, and/or communication system 445. In embodiments, recording device 410 may correspond to recording device 110-5 with brief reference to FIG. 1.

Processor 413 may be similar to processor 213, with brief reference to FIG. 2B, and/or any other processor, processing circuit, or the like discussed herein. Processor 413 may comprise any circuitry, electrical components, electronic components, software, and/or the like configured to perform various operations and functions discussed herein. For example, processor 413 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, processor 413 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 413 may include data buses, output ports, input ports, timers, memory, arithmetic units, and/or the like.

Processor 413 may be configured to provide and/or receive electrical signals whether digital and/or analog in form. Processor 413 may provide and/or receive digital information via a data bus using any protocol. Processor 413 may receive information, manipulate the received information, and provide the manipulated information. Processor 413 may record (e.g., buffer, store, etc.) information and retrieve recorded information. Information received, recorded, and/or manipulated by processor 413 may be used to perform a function, control a function, and/or to perform an operation or execute a stored program.

Processor 413 may control the operation and/or function of other circuits and/or components of recording device 410. Processor 413 may receive status information regarding the operation of other components, perform calculations with respect to the status information, and provide commands (e.g., instructions) to one or more other components. Processor 413 may command another component to start operation, continue operation, alter operation, suspend operation, cease operation, or the like. Commands and/or status may be communicated between processor 413 and other circuits and/or components via any type of bus (e.g., SPI bus) including any type of data/address bus.

In various embodiments, processor 413 may be in electrical and/or electronic communication with memory 415, network interface 417, image capturing system 420, audio capturing system 430, and/or communication system 445. Processor 413 may be in electrical, electronic, and/or mechanical communication with user interface 440.

Memory 415 may be similar to memory 215, with brief reference to FIG. 2B, and/or any other memory discussed herein. Memory 415 may comprise one or more memory, data structures, or the like configured to record data, programs, and/or instructions. Memory 415 may be in electrical and/or electronic communication with processor 413, network interface 417, image capturing system 420, and/or audio capturing system 430.

In an embodiment, memory 415 may comprise a tangible, non-transitory computer-readable memory. Instructions stored on the tangible non-transitory memory may allow processor 413 to perform various operations, functions, and/or steps, as described herein. For example, in response to processor 413 executing the instructions on the tangible non-transitory memory, processor 413 may communicate with image capturing system 420 and/or audio capturing system 430 to capture image and/or audio data, alter captured communication audio data, cease altering captured communication audio data, end capturing of the image and/or audio data, and/or the like, as discussed further herein. Processor 413 may execute the instructions in response to operation of user interface 440, as discussed further herein. In an embodiment, memory 415 may also be configured to receive, store, and maintain incident recordings, including captured image and audio data. In that regard, memory 415 may include a storage medium, data structure, database, memory unit, hard-disk drive (HDD), solid state drive (SSD), removable memory, and/or the like.

Network interface 417 may be similar to network interface 217, with brief reference to FIG. 2B, and/or any other network interface discussed herein. Network interface 417 may be configured to enable the transmission and/or reception of data between recording device 410 and one or more additional devices, servers, networks, or the like. Network interface 417 may be in electric and/or electronic communication with processor 413 and/or memory 415. Network interface 417 may comprise one or more suitable hardware and/or software components capable of enabling the transmission and/or reception of data, such as, for example, a communications unit, as discussed further herein. In various embodiments, network interface 417 may receive data associated with one or more of a communication activation signal and a communication ending signal as further described herein Image capturing system 420 may be similar to image capturing system 220, with brief reference to FIG. 2B, and/or any other image capturing system discussed herein. Image capturing system 420 may be configured to capture an image or series of images (e.g., video). For example, during an incident recording image capturing system 420 may be configured to capture images and/or video of the incident recording. Image capturing system 420 may comprise various hardware and/or software components configured to capture images and/or video. For example, image capturing system 420 may comprise one or more cameras configured to capture images and/or video. Image capturing system 420 may be in electric and/or electronic communication with processor 413 and/or memory 415. Processor 413 may control (e.g., instruct) image capturing system 420 to begin capturing images and to end capturing of the images. Processor 413 may also control (e.g., instruct) image capturing system 420 to transmit the captured images to memory 415 for storage. Image capturing system 420 may transmit (e.g., stream) the captured images to memory 415 as the images are captured or in response to image capturing system 420 ending capturing of the images.

Audio capturing system 430 may be similar to audio capturing system 230, with brief reference to FIG. 2B, and/or any other audio capturing system discussed herein. Audio capturing system 430 may be configured to capture audio. For example, during an incident recording audio capturing system 430 may be configured to capture audio data of the incident recording. Audio capturing system 430 may comprise various hardware and/or software components configured to capture audio. For example, audio capturing system 430 may comprise one or more microphones configured to capture audio. Audio capturing system 430 may be in electric and/or electronic communication with processor 413 and/or memory 415. Processor 413 may control (e.g., instruct) audio capturing system 430 to begin capturing audio and to end capturing of the audio. Processor 413 may also control (e.g., instruct) audio capturing system 430 to transmit the captured audio to memory 415 for storage. Audio capturing system 430 may transmit (e.g., stream) the captured audio to memory 415 as the audio is captured or in response to audio capturing system 430 ending capturing of the audio.

User interface 440 may be similar to user interface 240, with brief reference to FIG. 2B, user interface 360, with brief reference to FIG. 3, and/or any other user interface discussed herein. User interface 440 may be configured to enable a user to interact with recording device 410. For example, user interface 440 may be configured to enable the user to control operation of recording device 410, including starting and stopping audio and/or image recording. As a further example, user interface 440 may enable a user to control the ingestion and transmission of audio, including communication audio data, the volume of audio output, and/or the like. User interface 440 may be in electrical, electronic, and/or mechanical communication with processor 413 and/or communication system 445.

User interface 440 may comprise any suitable hardware, software, mechanical, and/or electronic components configured to enable the user interaction. For example, and in accordance with various embodiments, user interface 440 may comprise a button, switch, or the like. In that regard, user interface 440 may be configured to move, slide, rotate, or otherwise become physically depressed or moved upon application of physical contact. As a further example, and in accordance with various embodiments, user interface 440 may comprise a touchscreen or similar interface enabling user input. As a further example, and in accordance with various embodiments, user interface 440 may include voice control technology. In that regard, user interface 440 may at least partially integrate with audio capturing system 430 to receive voice commands (e.g., "Record", "Stop Record", "Capture Image", "Record Audio", "Start Communication", etc.). Voice command technology is well known in the art, and user interface 440 may implement any suitable voice command technology.

In various embodiments, communication system 445 may comprise a communication output module 447 and/or a communication input module 449. Communication system 445 may have similar functionalities and components as communication device 350, with brief reference to FIG. 3, and/or any other communication system, device, or the like discussed herein.

Communication output module 447 may be similar to communication output 370 of communication device 350, with brief reference to FIG. 3, and/or any other communication output module or component discussed herein. Communication output module 447 may be configured to output audio and/or signal data. For example, communication output module 447 may be configured to output the communication activation signal, the communication audio data, and/or the communication ending signal, as discussed further herein. Communication output module 447 may comprise one or more components (e.g., hardware, software, etc.) configured to generate and/or output audio such as, for example, audio processing and/or generating components (e.g., discrete soundcards, integrated soundcards, processors, processing circuits, integrated circuits, amplifier, etc.), audio output components (e.g., speakers), and/or the like. In response to the communication activation signal and/or the communication ending signal comprise a non-audio signal, Communication output module 447 may also comprise one or more components configured to generate and/or output signals, such as for example signal generating components (e.g., Bluetooth® beacon, etc.), wireless transmission components, and/or the like.

Communication input module 449 may be similar to communication input 390 of communication device 350, with brief reference to FIG. 3, and/or any other communication input module or component discussed herein. Communication input module 449 may be configured to ingest audio inputs. For example, communication input module 449 may be configured to ingest communication audio data from a user. In various embodiments wherein a communication activation signal and/or a communication ending signal are voice commands, communication input module 449 may be configured to ingest the communication activation signal and/or the communication ending signal. Communication input module 449 may comprise one or more components (e.g., hardware, software, etc.) configured to ingest audio such as, for example, audio processing components (e.g., discrete soundcards, integrated soundcards, processors, processing circuits, integrated circuits, amplifier, etc.), audio input components (e.g., microphones), and/or the like.

In various embodiments, communication input module 449 may at least partially share components with audio capturing system 430. For example, communication input module 449 and audio capturing system 430 may together comprise a single microphone (or plurality of microphones) configured to capture all audio (e.g., incident audio data, communication audio data, etc.).

In various embodiments, communication input module 449 may comprise discrete components from audio capturing system 430. For example, communication input module 449 and audio capturing system 430 may each comprises separate microphones, or sets of microphones. The microphone for audio capturing system 430 may be configured to capture incident audio data. The microphone for communication input module 449 may be configured to capture communication audio data. In that regard, the microphone for communication input module 449 may be angled or directed towards a user's mouth to more efficiently capture the communication audio data. The microphone for audio capturing system 430 may be angled or directed in a different (e.g., perpendicular, opposite, etc.) direction to more efficiently capture incident audio data.

Figure 5:
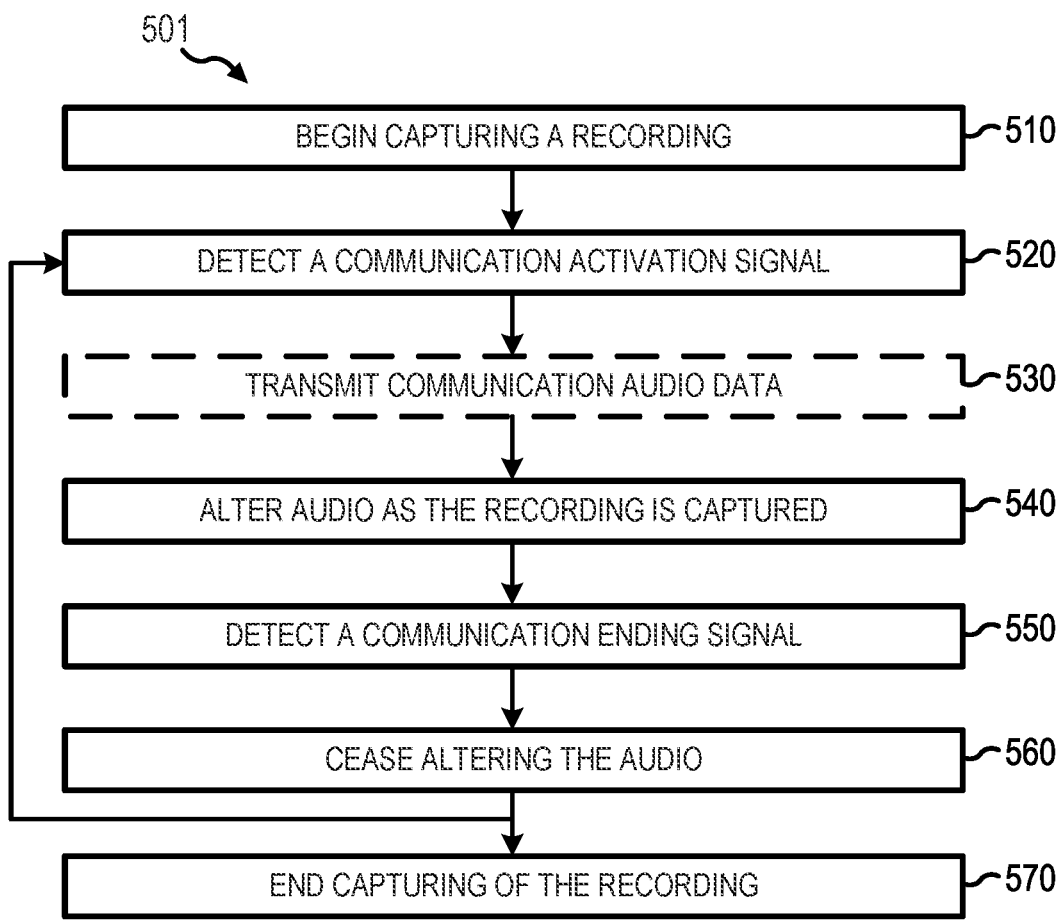
FIG. 5 illustrates a process flow for a method of altering communication audio captured during an incident recording, in accordance with various embodiments.
Figure 6:
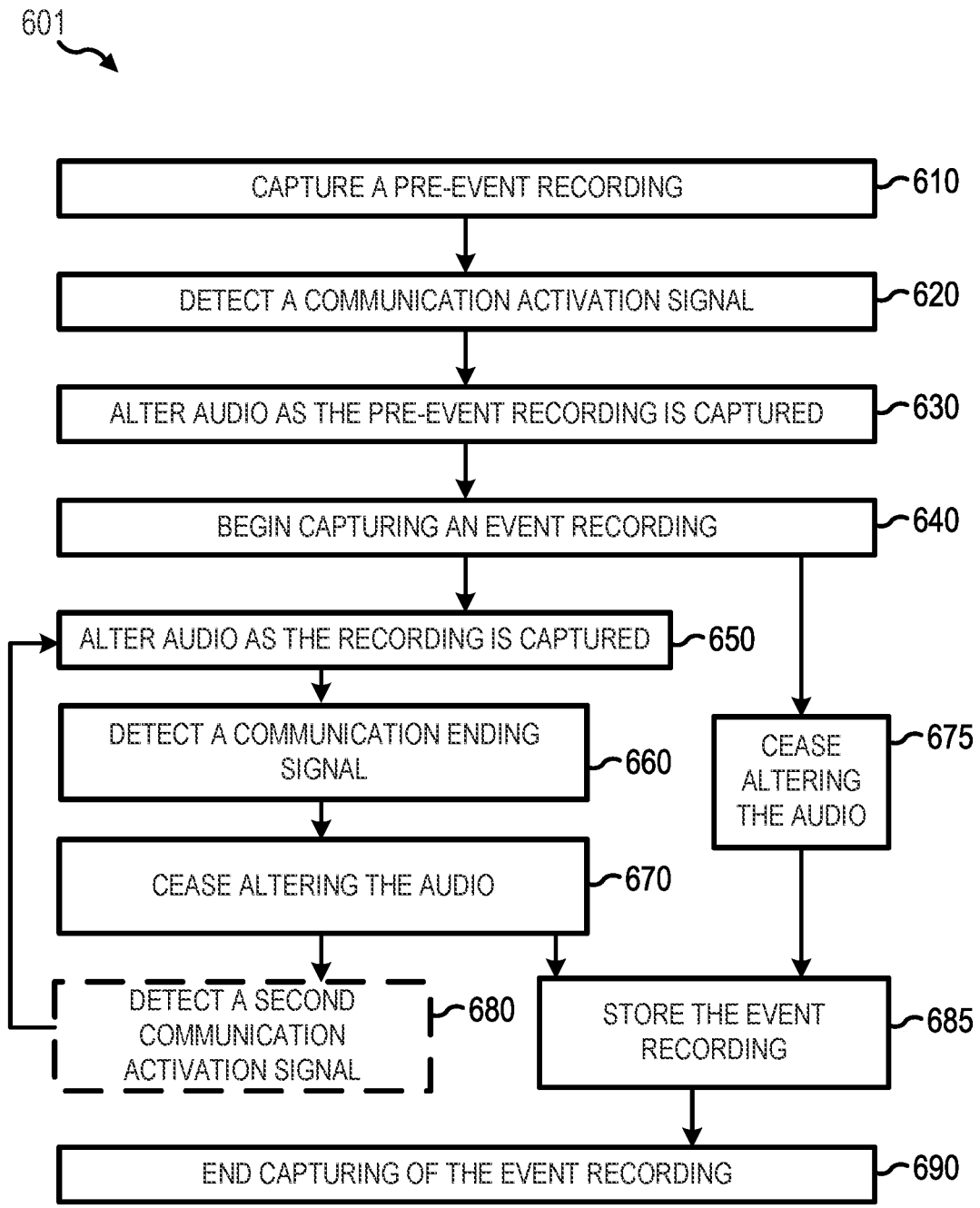
FIG. 6 illustrates a process flow for a method of altering communication audio captured during a pre-event recording of an incident recording, in accordance with various embodiments.

Referring now to FIGS. 5 and 6, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 5 and 6, but also to the various system components as described above with reference to FIGS. 1-4. References to system components of a specific figure should not be construed as limiting, as relationships indicated by such references may also apply to one or more system components described in a same figure or other figures.

In various embodiments, and with specific reference to FIG. 5, a method 501 for altering communication audio captured during an incident recording is disclosed. In embodiments, method 501 may be performed by a recording device. The recording device may be configured to perform one or more steps of method 501 and/or any other method or process disclosed herein.

Method 501 may begin in response to an initiate capture signal detected by a recording device. The initiate capture signal may indicate that an incident recording should be captured. The initiate capture signal may indicate that the recording device should begin capturing data for the incident recording. Responsive to the initiate capture signal, a processor of the recording device may begin capturing the incident recording, wherein the incident recording includes incident data.

In embodiments, an initiate capture signal may include an input received by the recording device. The input may be received via one or more of user interface, network interface, or audio capturing system. The input may include one or more of a wireless transmission, user interaction, or other input indicting that a recording should be captured. The wireless transmission may comprise a notification received from another device in communication with the recording device. The other device may be in proximity with the recording device. The notification may indicate a change in status of the other device. The other device may transmit the wireless transmission comprising the notification when the change in status occurs. For example, the notification may be included in a wireless transmission from a weapon, wherein the notification indicates that the weapon has been unholstered, a safety of the weapon has been deactivated, the weapon has been fired, or other status of the weapon. As a related example, and further in accordance with various embodiments, the notification may be received in a wireless signal from a device comprising a sensor in a vehicle, wherein the notification indicates one or more of a door of the vehicle being opened or closed, a light of the vehicle being activated or deactivated, a siren of the vehicle being activated or deactivated, a trunk of the vehicle being opened or closed, or other change in status of a component of the vehicle. The user interaction may comprise an input received via a user interface of the recording device. For example, the user interaction may comprise an input received via one or more of a power button and an event button of user interface 240 of recording device 210 with brief reference to FIG. 2. As a related example, and further in accordance with various embodiments, the user interaction may comprise a predetermined sound (e.g., sound of gunshot, voice command, etc.) received via a microphone of the user interface. One of ordinary skill will appreciate that one or more other inputs may be received via a record device to initiate capture of a recording of an incident, including inputs different from those recited above or otherwise disclosed herein. In accordance with the initiate capture signal, the recording device may begin capturing an incident recording.

In various embodiments, an incident recording may comprise data. The data may comprise recorded data that is captured by the recording device relative to an incident (e.g., event). The data may include data captured before and after an occurrence of the incident. The data may include audio data (e.g., incident audio data). The data may include image data (e.g., incident image data, incident video data, combinations of incident image data and incident video data, etc.). For example, the data may comprise audio data captured by recording device 210. As a related example, the data may comprise image data captured by recording device 210. The audio data may correspond to audio captured by audio capturing system 230. The image data may correspond to image and/or video captured by image capturing system 220. The audio and/or visual information may be captured by an incident recording device, such as, for example, a body-worn camera, a smart phone or internet of things (IoT) device, a vehicle-mounted camera, a surveillance camera, and/or any other recording device discussed herein. For example, and in accordance with various embodiments. the incident recording may be captured by one of recording device 210 and recording device 410.

In various embodiments, data of an incident recording may be recorded in memory. For example, the data of the incident recording may be recorded in memory 215. The data may be recorded in volatile or non-volatile memory. Data recorded in volatile memory may comprise buffered data. Data recorded in non-volatile memory may comprise stored data. Recording data, by a processor of a recording device, may comprise one or more of buffering the data temporarily in the memory and storing the data permanently in the memory.

In various embodiments, a recording device may begin capturing a recording (step 510). The recording may comprise an incident recording. By beginning capturing the recording, the recording device may be configured to record information related to an incident. Beginning capture of the recording (step 510) may comprise starting capture of data for the recording. The recording device may start capturing data via one or more of an image capturing system and an audio capturing system. For example, processor 213 of recording device 210 may control image capturing system 220 to initiate capture of image data and/or control audio capturing system 230 to initiate capture of audio data with brief reference to FIG. 2. The audio data may be captured via at least one microphone of audio capturing system 230 of recording device 210. In embodiments, data for a recording may not be captured by the recording device before beginning capture of the recording. Data captured after beginning capture of the recording may be recorded (e.g., buffered, stored, etc.), deleted, transmitted and/or further processed as discussed herein. In various embodiments, beginning capturing the recording (step 510) may include detecting an initiate capture signal. The initiate capture signal may be received via a component of the recording device. For example, recording device 210 may receive the initiate capture signal via one or more of user interface 240, network interface 217, and audio capturing system 230 with brief reference to FIG. 2. The initiate capture signal may be further detected in accordance with processing performed by processor 213 of recording device 210. For example, processor 213 may process an input received one or more of user interface 240, network interface 217, and audio capturing system 230 and detect the initiate capture signal based on the processing of the input. Processor 213 may process the input to identify information (e.g., data) indicating the input corresponds to an initiate capture signal. By detecting the initiate capture signal, the recording device may be controlled to selectively capture the recording.

In various embodiments, a recording device may detect a communication activation signal (step 520). The communication activation signal may indicate that a communication will occur. The communication activation signal may indicate that communication audio will be received by the recording device. For example, detecting a communication activation signal at recording device 110-1 may indicate that first user 1 is preparing to provide communication audio to communication device 150-1 with brief reference to FIG. 1. Because of the proximity of communication device 150-1 to recording device 110-1, the communication audio from the first user 1 may be captured in a recording captured by recording device 110-1. As another example, detecting a communication activation signal at recording device 110-5 may indicate that third user 5 is preparing to provide communication audio to recording device 110-5. Because a communication system (e.g., communication device) is integrated with recording device 110-5, the communication audio from third user 5 may be captured in a recording captured by recording device 110-5. In embodiments, detecting a communication activation signal at recording device 110-1 or recording device 110-5 may indicate that second user 3 is preparing to provide communication audio to communication device 150-3. Because of the proximity of communication device 150-3 to recording device 110-1 and recording device 110-5, the communication audio from the second user 3 may be captured in a recording respectively captured by each of recording device 110-1 and recording device 110-5. In various embodiments, detecting the communication activation signal may indicate that communication audio will be subsequently received by the recording device, independent of whether the communication audio is directed for transmission to the recording device itself (e.g., recording device 110-5) or a separate communication device (e.g., communication device 150-1 or communication device 150-3). In various embodiments, the recording device may detect the communication activation signal prior to capturing the communication audio in the audio data of a recording.

In various embodiments, detecting the communication activation signal may include receiving an input via a user interface of a recording device. The input may comprise a user interaction with a component of the user interface. For example, a button on a user interface of recording device 110-5 may be actuated and a processor of recording device 110-5 may detect the communication activation signal in accordance with the actuation of the button. In accordance with the input, the communication activation signal may be directly received by the recording device.

In various embodiments, detecting the communication activation signal may include receiving an input via an audio capturing system of a recording device. The input may comprise a predetermined audio or sound (e.g., a voice command, activation sound, etc.). For example, audio capturing system 230 may receive audio comprising a predetermined sound and processor 213 of recording device 210 may identify the predetermined sound in the audio to detect the communication activation signal. The input may be received by the audio capturing system directly from a source of communication audio. For example, the input may be received directly as a voice command from a user. As a related example, the input may be received by the audio capturing system indirectly from a source of communication audio. For example, the input may comprise an activation sound from a communication device, wherein the input is generated by a communication output of the communication device. In embodiments, the recording device may be configured to detect communication activation signals both directly from a source of the communication activation signal, as well as indirectly as a second communication activation signal generated in response to a first communication activation signal. In embodiments, a same, single communication activation signal comprising an audio input may commonly indicate to both a user and a recording device that a communication will occur.

In various embodiments, detecting the communication activation signal may comprise receiving an input via a network interface of the recording device. The input may comprise a wireless transmission. For example, the communication activation signal may be transmitted via a communication output 370 of communication device 350 with brief reference to FIG. 3. The communication activation signal may be received via network interface 217 of recording device 210 with brief reference to FIG. 2. The communication activation signal may comprise a notification regarding a first communication activation signal received by the communication device 350. The detected communication activation signal may comprise a second communication activation signal transmitted by communication device 350 in response to the first communication activation signal received by communication device 350. In various embodiments, the wireless transmission may be broadcast for reception by one or more nearby devices, including the recording device, such that each recording device may is not required to be paired with the communication device, yet can still detect the communication activation signal. In embodiments, receiving the input via the network interface may enable a communication device or a first recording device to provide indication to a second recording device that a communication will occur, while not adding additional sound to an environment in which the communication device or first recording device and the second recording device is disposed.

In various embodiments, detecting the communication activation signal may comprise receiving the communication activation signal from a communication device. The communication device may be separate from the recording device. For example, the communication activation signal may be transmitted via a communication output 370 of communication device 350 with brief reference to FIG. 3. The communication activation signal may be received via one of a network interface 417, audio capturing system 430, and a communication input module 449 of recording device 410 with brief reference to FIG. 4. By receiving a communication activation signal from a separate communication device, the recording device may be configured to detect when a nearby communication device is configured to receive communication audio. In various embodiments, the recording device may be configured to detect when multiple nearby communication devices are configured to receive communication audio in accordance with multiple communication activation signals detected from the multiple nearby communication devices.

In various embodiments, detecting the communication activation signal may comprise detecting whether the communication audio data is transmitted over a private channel or a public channel. The communication activation signal may include a data packet. The data packet may indicate whether the communication audio data is transmitted over a private channel or a public channel. Detecting the communication activation signal may include detecting the data packet. In embodiments, detecting the data packet may further include storing the data packet in memory (e.g., memory 215 with brief reference to FIG. 2).

In various embodiments, after the communication activation signal is detected, and responsive to the communication activation signal, communication audio data may be captured by a recording device. The communication audio data may be captured in audio data for an incident recording. The communication audio data may correspond to communication audio generated proximate to the recording device, such that the communication audio is captured by an audio capturing system of the recording device as communication audio data in the audio data. In embodiments, the audio data may comprise a first portion in which communication audio data is not captured and a second portion in which communication audio data is captured in the audio data. A time at which a communication activation signal is detected by the recording device may correspond (e.g., match, equal, etc.) to a time at which the audio data is divided between the first portion and the second portion. In embodiments, an entire portion of the audio data may comprise the communication audio data. The entire portion of the audio data may comprise an entire portion of the communication audio data captured by the recording device. In embodiments, one or more of the portion of the audio data and the portion of the communication audio data may be captured by a same microphone of the recording device.

In various embodiments, a recording device may be optionally configured to transmit the communication audio data (step 530). The recording device may comprise a communication system and a network interface or communication output by the communication audio data may be transmitted to a remote device. The communication audio data may be transmitted via a wireless wide area network to the remote device. The communication audio data may be transmitted to a remote location. The communication audio data may be transmitted beyond a range at which a communication activation signal may be received and transmitted in accordance with various aspects of the present disclosure. For example, recording device 410 may capture communication audio data in audio data via audio capturing system 430 or communication input 449 and transmit the communication audio data to a remote communication device or remote recording device via one or more of network interface 417 and communication output 447 with brief reference to FIG. 4. The transmitted communication audio data may correspond to communication audio data as captured by one of an audio capturing system and a communication input of the recording device. The transmitted communication audio data may be preserved as initially captured by the recording device. The transmitted communication audio data may be unmuted, unfiltered, or otherwise unaltered, independent of whether an initiate capture signal has been detected. In embodiments, unaltered communication audio data may comprise communication audio data for which one or more voice sounds captured in the communication audio data are preserved by the recording device after initial capture of the recording device. After initial capture of the communication audio data, the recording device may be enabled to at least partially alter the communication audio data via applying one or more transformations on the communication audio data, but selectively not apply the one or more transformations in order to provide unaltered communication audio data. For example, the one or more transformations may not be applied to communication audio data that is transmitted and/or prior to transmission of the communication audio data from the recording device. Such an arrangement may enable the recording device to perform operations of a communication device, while yet maintaining data privacy and security for the communication audio relative to other operations performed by the recording device.

In various embodiments, the recording device may alter the audio data of an incident recording. By altering the audio data, communication audio data captured in audio data may be prevented from being recorded for an incident recording. The communication audio data may be excluded from the audio data of the incident recording. The audio data may be altered in accordance with the recording device detecting the communication activation signal. The audio data may be altered to at least partially alter the communication audio data captured in the audio data. Altering the audio data may render the communication audio data captured in the audio data unintelligible. Altering the audio data may include removing the communication audio data. The altering of the audio data may include removing the audio data altogether. Altering the audio data may include transforming the communication audio data. Altering the audio data may mask the communication audio data to prevent the communication audio data from being comprehensible upon playback of the audio data of the incident recording.

In various embodiments, a recording device may alter audio as the recording is captured (step 540). Altering the audio may include altering, by a processor of the recording device, the audio data of an incident recording. The audio data may be altered based on detecting the communication activation signal (step 520) by the recording device. Altering the audio data may include at least partially altering the communication audio data captured in the audio data. Altering the audio data may change one or more values by which audio captured by an audio capturing system may be represented. For example, audio data captured by audio capturing system 230 may be altered by processor 213 of recording device 210 to at least partially alter communication audio data captured in the audio data, with brief reference to FIG. 2. Altering the audio may include continuing to capture image data for the incident recording. In embodiments, incident image data for an incident recording may be recorded independent of a communication activation signal, communication audio data, and/or communication ending signal.

In various embodiments, altering the audio data may comprise muting the audio data. Muting the audio data may ensure privacy and security of the communication audio data. Muting the audio data may comprise eliminating, removing, or otherwise reducing the audio data to at least partially alter the communication audio data captured in the audio data. Muting the audio data may include deleting the audio data from the incident recording. The communication audio data may be completely altered by muting the audio data.

In various embodiments, altering the audio data may comprise reducing a volume of the audio data. Reducing the volume may decrease perception as well as decrease prominence of the communication audio data in the audio data relative to other data captured in the incident recording. Reducing the volume may decrease a maximum amplitude of the audio data. For example, reducing the volume may decrease the maximum amplitude of the audio data by greater than 50%, greater than 75% or more, or greater than 90% of a maximum amplitude of audio data as captured by an audio capturing system of the recording device. In embodiments, reducing the volume may alter the communication audio data less than other manners of altering the audio data, such as muting the audio data.

In various embodiments, altering the audio data may comprise distorting the audio data. Distorting the audio data may include adjusting one or more of an amplitude, a phase, or a frequency of the audio data or combinations of these properties to at least partially alter the communication audio data. Distorting the audio data may include applying a filter to the audio data. Distorting the audio may include increasing, decreasing, or changing a value of one or more properties of audio represented in the audio data such that communication audio data does not remain and/or is rendered less comprehensible in the resulting, altered audio data.

In various embodiments, altering the audio data may comprise generating an anti-communication audio based on the communication audio data. The anti-communication audio may be selected to cancel or distort communication audio in the audio data. For example, the anti-communication audio may comprise one or more of phase-delayed communication audio and masking audio. The phase-delayed communication audio may include audio captured via at least one microphone, wherein a delay is added to the audio relative to a time at which the audio was captured. The masking audio may comprise a noise audio, such as a white noise audio. A processor of the recording device may generate the anti-communication audio for use in altering audio data.

In various embodiments, altering the audio data may further comprise outputting the anti-communication audio to distort or cancel the communication audio data. Outputting the anti-communication audio may include transmitting the audio via a user interface of the recording device and/or combining digital audio comprising the anti-communication audio with the audio data. Transmitting the anti-communication audio may comprise outputting the anti-communication audio via a transducer of the user interface such that the audio may be subsequently captured with the audio data to alter the audio data. For example, white noise audio may be output by a speaker of user interface 240 to distort audio data subsequently captured by audio capturing system 430 with brief reference to FIG. 4. Combining the digital audio may comprise adding one or more first phase-delayed audio signals from one or more first microphones of the recording to one or more second audio signals of the recording device to cancel, reduce, or distort one or more frequencies of the first audio signal. Combining the digital audio may comprise applying a beamforming technique to captured audio data. The beamforming technique may cancel, reduce, or distort audio signals that originally from a predetermined direction relative to the recording device. For example, the direction may correspond to a direction of a mouth of a user on which the recording device is mounted or worn (i.e., body-worn). The beamforming technique may combine audio data received from different microphones of a recording device to provide beamformed audio data. Outputting the anti-communication audio may be performed by a processor of the recording device and, in embodiments, further involve other components of a recording device such as a microphone or speaker of a user interface.

In various embodiments, altering the audio data may comprise altering audio from the audio data having a frequency in a voice frequency range. Altering the audio may include applying a filter to the audio data. The filter may decrease an amplitude of the audio data in a frequency range in which a human voice may be captured in the audio data. For example, filtering the audio may include applying one of a high-pass filter and a notch filter to the audio, wherein one or more cutoff frequencies of the filters are selected to attenuate frequencies of audio data that correspond to a voice frequency range.

In various embodiments, altering the audio data may comprise altering the audio to at least partially retain non-communication audio data captured at a same time communication audio data is captured. For example, audio of a voice frequency band may be removed from the audio data, preserving non-communication audio data in the audio data captured in frequency bands above and/or below the voice frequency band. As another example, and in various embodiments, altering the audio data may include cancelling a portion of the audio data determined to be associated with the communication audio data. Accordingly, embodiments according to various aspects of the present disclosure enable non-communication audio data in audio data to be recorded in an incident recording, while also preventing communication audio data from being recorded.

In various embodiments, altering the audio data may comprise determining whether the communication audio data is transmitted over a private channel or a public channel. The determining may be performed in accordance with information in a communication activation signal. The information may include a data packet. For example, determining whether the communication audio data is transmitted over a private channel or a public channel may include analyzing, by a processor of the recording device, whether the data packet includes a first value and/or a different, second value. A communication activation signal comprising a data packet with the first value may indicate transmission of the communication audio data over a private channel. A communication activation signal comprising a data packet with the second value may indicate transmission of the communication audio data over a public channel. In response to the data packet of the communication activation signal indicating that the communication audio data is transmitted over the private channel, altering the audio data may include altering a portion of the audio data. In response to the data packet of the communication activation signal indicating that the communication audio data is transmitted over the public channel, the portion of the audio data may not be altered. In response to the data packet of the communication activation signal indicating that the communication audio data is transmitted over the public channel, altering the audio data may include not altering a portion of the communication audio data. Accordingly, communication audio that is broadcast or otherwise made publicly available in an initial communication may not be prevented from being included in an incident recording. Such an arrangement may decrease an amount of audio data to be altered, while retaining an ability of the recording device to exclude private communication audio data from an incident recording.

In embodiments, detecting the communication activation signal (step 510) may occur after beginning capture of an incident recording (step 520). However, embodiments according to various aspects of the present disclosure are not so limited. In other embodiments, detecting the communication activation signal may occur prior to beginning capture of an incident recording. In such embodiments, communication audio data may be transmitted (step 530) after the communication activation signal is detected and further be altered (step 540) after capturing the recording is begun by a recording device. Communication audio data captured before an initiate capture signal is detected may be transmitted without being altered and/or not recorded. Audio data recorded prior to a communication activation signal may be recorded without being altered. After a communication activation signal is detected and the recording device has begun capturing audio data, the recording device may continue altering the audio data until one of an end capture signal and a communication ending signal is detected.

In various embodiments, a same microphone of a recording device may be used to capture communication audio data that is both subsequently transmitted in an unaltered manner and altered before being captured in an incident recording. A processor of the recording device may separately transmit a portion of the communication audio data via a network interface unaltered and alter the portion of the communication audio data. For example, audio data captured by audio capturing system 430 may be transmitted by network interface 417 of recording device 410 to a remote device with brief reference to FIG. 4. This audio data may also be altered by processor 413 of recording device 410 for being included in an incident recording. Same communication audio data may be both excluded and preserved by the recording device. Communication audio data captured at a single point in time may be both transmitted unaltered via a network interface and altered before being included in an incident recording. In embodiments, each of the network interface 417 and processor 413 may each receive a copy of the audio data, thereby enabling distinct, contrasting operations to be applied by the recording device for a same audio data. In various embodiments, and by such an arrangement, the recording device is enabled to perform functions of both communication and recording with a common set of components. In embodiments, data captured at same point in time may be subsequently preserved and altered in order to serve different operations of a recording device.

In various embodiments, a recording device may detect a communication ending signal (step 550). The recording device may detect the communication ending signal similar to detecting the communication activation signal in step 520. The communication ending signal may indicate that communication may no longer occur (e.g., has ended). The communication ending signal may indicate that communication audio will not be further provided proximate the recording device and/or that communication audio will not be received by the recording device. The communication ending signal may comprise one or more of a wireless transmission, a voice command, an activation sound, or a user interface activation as discussed herein. The communication ending signal may be detected via one or more of a user interface device, communication input, or audio capturing system of a recording device. For example, the wireless communication may be detected via network interface 417 or communication input 449, the voice command and the activation sound may be detected via one of audio capturing system 430 or communication input 449, and the user interaction may be detected via user interface 440 of recording device 410 with brief reference to FIG. 4. In embodiments, a recording device may continue to capture data for an incident recording independent of a communication ending signal being detected.

In various embodiments, a recording device may cease altering the audio (step 560). Ceasing altering the audio may include ceasing altering audio data. By ceasing altering the audio data, the audio data may be recorded in an incident recording as originally captured. Ceasing altering audio may include ceasing altering audio data captured for incident recording. The altering may be ceased in accordance with the recording device detecting the communication ending signal. Incident audio may be captured in the audio data of the incident recording may be preserved. The audio data may be maintained as initially captured by an audio capturing system of the recording device. A processor of the recording device may discontinue altering the audio data. Ceasing altering the audio may include ceasing, by the processor, altering the audio data. Ceasing altering the audio may include providing, by the processor, unaltered audio data.

In various embodiments, a recording device may detect an end capture signal that indicates that capturing a recording should end. The end capture signal may indicate that additional data for the recording should not be captured. The end capture signal may include an input received by the recording device. The input may be received via one or more of user interface network interface, or audio capturing system. The input may include one or more of a wireless transmission, user interaction, or other input indicting that an incident recording should be discontinued. For example, the end capture signal may comprise an input received via a user interface of the recording device. The end capture signal may be received after an initiate capture signal and cease capture by the recording device previously initiated in response to an initiate capture signal. The end capture signal may indicate that an incident is no longer occurring and/or the recording device should no longer capture data associated with an incident represented in an incident recording. In response to the end capture signal, the recording device may end capturing the recording.

In various embodiments, a recording device may end capturing of a recording (step 570). Ending capture of the recording may comprise ceasing capture of data for the recording (i.e., incident recording). The recording device may stop capturing data via one or more of an image capturing system and an audio capturing system. For example, processor 213 of recording device 210 may control image capturing system 220 to discontinue capture of image data and/or control audio capturing system 230 to discontinue capture of audio data. Additional data for a recording may not be captured by the recording device after ending capture of the recording. Data captured prior to ending capture of the recording may be stored, deleted, transmitted and/or further processed as discussed elsewhere herein.

In various embodiments, ending capture of the recording may include detecting an end capture signal. The recording device may detect the end capture signal. The end capture signal may be received via a component of the recording device. For example, recording device 210 may receive the end capture signal via one or more of user interface 240, network interface 217, and audio capturing system 230 with brief reference to FIG. 2. The end capture signal may be further detected in accordance with processing performed by processor 213 of recording device 210. For example, processor 213 may process an input received via responsive to an input received via one or more of user interface 240, network interface 217, and audio capturing system 230 and detect the end capture signal based on the processing of the input.

In various embodiments, a recording device may be configured to enable data to be recorded prior to occurrence of an incident. The data may be captured in a pre-event recording. Upon the occurrence of the incident, the pre-event recording may be further stored in an incident recording. The pre-event recording may enable the recording device to capture additional information regarding the incident. However, the pre-event recording may also provide additional difficulty in preventing unauthorized or unintentional recording of communication audio. For example, the occurrence of an incident may not be predictable. A period of time prior to the occurrence of the incident may also therefore be unpredictable. Yet, audio data for the period of time may be captured in audio data for the pre-event recording. A determination by the recording device as to whether communication audio provided during the period of time is eventually stored for an incident recording may not be made until after the communication audio has already been provided and captured by the recording device. Because the occurrence of an incident may be unpredictable, and may cause audio to be retroactively included in an incident recording, privacy and security of communication audio may be difficult to provide in the context of pre-event recording.

Further, and according to various embodiments, the recording device may be configured to automatically begin capturing an incident recording responsive to a detected event capture signal. The recording device responding to the event capture signal may ensure that important information regarding an incident is captured in an incident recording. For example, a recording device may automatically respond to an event capture signal to ensure that an incident recording is captured when a weapon is removed from a holster or a siren of a vehicle is activated. The event capture signal may be detected automatically by the recording device, which may be further in communication with another computing device. The incident recording may be captured automatically, independent of any direct user interaction with the recording device. While this configuration may increase capture of data related to the incident, it may also increase the unpredictability of whether communication audio will or will not be stored for subsequent playback and review in an incident recording.

Various embodiments of the present disclosure address the deficiencies discussed above, as well as others, to maintain privacy and security of communication audio in the presence of a recording device.

In various embodiments, and with specific reference to FIG. 6, a method 601 for altering communication audio captured during a pre-event recording of an incident recording is provided. The incident recording may comprise the pre-event recording and an event recording. As further discussed below, method 601 may comprise one or more operations corresponding to one or more respective operations of method 501, with brief reference to FIG. 5.

In various embodiments, an incident recording may include a pre-event recording comprising data (e.g., pre-event data) captured prior to occurrence of an incident (e.g., an event). The data may include audio data (e.g., pre-event audio data). The data may include image data (e.g., pre-event image data, pre-event video data, combinations of pre-event image data and pre-event video data, etc.). The data may include data captured for a predetermined period of time prior to the occurrence of the event. For example, the pre-event recording may comprise image and/or audio data for a period of time corresponding to thirty seconds immediately prior to the occurrence of the incident. The data may be buffered for the pre-determined period of time prior to the occurrence of the incident. The data may be temporarily retained in volatile memory. The data may be captured in a circular buffer. The data may be buffered such that an oldest portion of data in a buffer is overwritten with another portion of data most recently captured by the recording device. The oldest portion may have been stored in the buffer for the predetermined period of time. After a portion of the data for the pre-event recording has been buffered for the predetermined period of time, the portion may be deleted, overwritten, erased, or otherwise rendered inaccessible to a processor of the recording device. The data may be deleted such that only another portion of the data most recently captured by the recording device may be buffered or otherwise made available on the recording device. Accordingly, the pre-event recording may provide data representing activity proximate the recording device prior to the occurrence of the incident. Upon the occurrence of the incident, a pre-event recording may be further stored by the recording device.

In various embodiments, the recording device may detect a first initiate capture signal. The first initiate capture signal may comprise a pre-event capture signal that indicates that capturing pre-event data should begin. The pre-event capture signal may include an input received via one or more of a user interface, a network interface, or other component of the recording device. For example, the pre-event capture signal may include one or more of a manual input received via the user interface, a voice command received via an audio capturing system, and a disconnection input received via network interface. The disconnection input may indicate that the recording device is no longer connected to another computing device for transmitting an incident recording from the recording device. As a further example, the pre-event capture signal may include a manual input for setting the recording device in a pre-event mode, wherein the recording device is configured to begin capturing a pre-event recording and, responsive to another input, enter an event mode in which an event recording is captured. In accordance with detecting the pre-event capture signal, the recording device may initiate capture of a pre-event recording.

In various embodiments, a recording device may capture a pre-event recording (step 610). The recording device may capture the pre-event recording similar to the beginning capture step 510, with brief reference to FIG. 5. By capturing the pre-event recording, the recording device may be configured to record information related to an incident. Particularly, the recording device may be configured to record information related to an incident prior to occurrence of the incident.

In various embodiments, capturing the pre-event recording (step 610) may include beginning capture of pre-event data for the pre-event recording. The recording device may start capturing pre-event data via one or more of an image capturing system and an audio capturing system. For example, processor 213 of recording device 210 may control image capturing system 220 to initiate capture of pre-event image data and/or control audio capturing system 230 to initiate capture of pre-event audio data with brief reference to FIG. 2. The pre-event audio data may be captured via at least one microphone of audio capturing system 230 of recording device 210. In embodiments, pre-event data for a pre-event recording may not be captured by the recording device before beginning capture of the pre-event recording. Pre-event data captured after beginning capture of the pre-event recording may be buffered or temporarily recorded as discussed herein.

In various embodiments, the recording device may capture the pre-event recording in response to detecting a first initiate capture signal. The first initiate capture signal may comprise a pre-event capture signal. Detecting the pre-event capture signal may be similar to detecting the initiate capture signal as discussed with respect to beginning capture step 510 with brief reference to FIG. 5. For example, recording device 210 may detect the pre-event capture signal via one or more of user interface 240, network interface 217, audio capturing system 230, and processor 213, with brief reference to FIG. 2. The pre-event capture signal may indicate that the recording device should be configured to begin capturing data for an incident upon receipt of a second initiate capture signal. In accordance with the pre-event capture signal, the recording device may begin capturing pre-event data. The pre-event data may be recorded in a manner different from event data for an incident. Particularly, only a most recently captured portion of the pre-event may be recorded for a pre-event recording and another, older portion of the pre-event recording may be temporarily buffered and then discarded by the recording device. Discarding the older portion may ensure that a memory of the recording device (e.g., memory 215 with brief reference to FIG. 2) does not become full with non-incident data unrelated to an incident, thereby preserving space in the memory for an incident recording. By detecting the pre-event capture signal, the recording device may be controlled to selectively capture the pre-event recording.

In various embodiments, capturing the pre-event recording (step 610) may include continuing capture of the pre-event recording. For example, pre-event data for a predetermined period of time may have been captured previously for the pre-event recording. Capturing the pre-event recording may include replacing a first portion of pre-event data previously captured with a second portion of pre-event data most recently captured by the recording device. The recording device may continue capturing pre-event data via one or more of an image capturing system and an audio capturing system. For example, processor 213 of recording device 210 may control image capturing system 220 to continue capture of pre-event image data and/or control audio capturing system 230 to continue capture of pre-event audio data with brief reference to FIG. 2. The pre-event audio data may continue to be captured via at least one microphone of audio capturing system 230 of recording device 210. In various embodiments, the capturing of the pre-event recording may be continued until one of an event capture signal and an end capture signal is detected by the recording device.

In various embodiments, a recording device may detect a communication activation signal (step 620). The recording device may detect the communication activation signal similar to the detecting in step 520, with brief reference to FIG. 5. The communication activation signal may indicate that communication audio data may be captured in the pre-event audio data captured by the recording device. The communication activation signal may be detected by one or more components of the recording device. For example, the communication activation signal may be detected by a combination of one or more of user interface 240, network interface 217, audio capturing system 230, and processor 213, with brief reference to FIG. 2. The communication activation signal may be detected by the recording device after capture of data for an incident recording (i.e., pre-event audio data) has been captured by the recording device.

In various embodiments, communication audio data associated with a communication may be captured in pre-event audio data for a pre-event recording. The pre-event audio data in which the communication audio data is captured may or may not be stored by the recording device. The communication audio data may be stored by recording device if capture of an event recording is initiated within a period of time after the communication audio data is captured in the pre-event recording. The period of time may correspond to a predetermined period of time for which pre-event data is buffered for the pre-event recording. If capture of the event recording is not initiated within the period of time, the communication audio data may be discarded (deleted, overwritten, etc.) by the recording device such that the communication audio data is not stored by the recording device. Discarded communication audio data may only be buffered (i.e., recorded temporarily) but not stored (i.e., recorded permanently in memory) by the recording device. Because storage of pre-event audio is determined after the pre-event audio data is captured, embodiments according to various aspects of the present disclosure alter the pre-event audio data independent of whether capture of the event recording is initiated. In various embodiments, the pre-event audio data may be altered prior to initiation of capture of event data for the event recording and after pre-event audio data is captured by the recording device. Accordingly, communication audio data may be protected independent of whether the communication audio data is ultimately recorded in an incident recording.

In various embodiments, a recording device may alter audio as the pre-event recording is captured (step 630). The recording device may alter the audio similar to altering audio in step 540, with brief reference to FIG. 5. Altering the audio may include altering, by a processor of the recording device, the pre-event audio data of the pre-event recording. The audio data may be altered based on detecting the communication activation signal (step 620) by the recording device. Altering the audio data may include at least partially altering the communication audio data captured in the pre-event audio data. Altering the pre-event audio data may comprise one or more of a group comprising muting the pre-event audio data, reducing a volume of the pre-event audio data, distorting the pre-event audio data, generating and outputting an anti-communication audio, and altering audio from the pre-event audio data having a frequency in a voice frequency range. Altering the pre-event audio data may change one or more values by which audio captured by an audio capturing system may be represented in the pre-event audio data. For example, audio data captured by audio capturing system 230 may be altered by processor 213 of recording device 210 to at least partially alter communication audio data captured in the audio data with brief reference to FIG. 2. The altered pre-event audio data may be captured via one or more microphones of audio capturing system 230. The same one or more microphone may capture a portion of the pre-event audio data prior to detecting the communication activation signal at step 620. Altering the audio may include continuing to capture image data for the pre-event recording. In embodiments, pre-event image data for a pre-event recording may be recorded independent of a communication activation signal, communication audio data, and/or a communication ending signal. Accordingly, data for an incident (e.g., incident image data and/or incident video data) may be captured relative to the incident, including when other data for the incident (e.g., incident audio data) is selectively altered according to various aspects of the present disclosure.

In various embodiments, altering the audio as the pre-event recording is captured may include increasing an amount of pre-event audio data buffered by the recording device that is altered. At a first time a communication activation signal is detected, a memory (e.g., buffer) in which the pre-event audio data is buffered may comprise only unaltered pre-event audio data. At a second time, the pre-event audio data for the pre-event recording may comprise only altered pre-event audio data. The second time may comprise a period of time after the first time, wherein the period time corresponds to a predetermined period of time for which pre-event audio data is buffered by the recording device for the pre-event recording. For example, if a pre-event recording comprises pre-event audio data corresponding to forty-five seconds of audio data most recently captured by an audio capturing system of the recording device, the pre-event audio data may comprise only altered pre-event audio data at a second time that is forty-five seconds after a communication activation signal is detected by the recording device. At the second time, all unaltered pre-event audio data may be deleted, overwritten, or otherwise removed from the pre-event audio data and replaced with more-recently captured pre-event audio data that is altered in accordance with step 630. At a third time between the first time and the second time, a first portion of the pre-event audio data may comprise altered pre-event audio data and a second portion of the pre-event audio data may comprise unaltered pre-event audio data. A size of the first portion relative to a size of the second portion may correspond to a relationship between the third time and the first and second times. When the third time is equally close to the first time and the second time, a size of the first portion may be equal to a size the second portion. When the third time is closer to the first time than the second time, a size of the first portion may be less than a size of the second portion. When the third time is closer to the second time than the first time, a size of the second portion may be less than a size of the first portion. As the third time increases from the first time toward the second time, the amount of the pre-event audio data comprising the altered pre-event audio data may also increase. Accordingly, after a communication activation signal is received, the pre-event audio data in a pre-event recording may include a portion of unaltered data, recorded as originally captured by an audio capturing system. When capture of an event recording is initiated within the period of time after the communication activation signal is detected, the portion of unaltered pre-event audio data may be further stored for the event recording. As such, an event recording may include a portion of unaltered pre-event audio data in embodiments according to various aspects of the present disclosure.

In various embodiments, an incident recording may comprise an event recording. The event recording may comprise data (e.g., event data) captured after occurrence of an incident (e.g., an event). The data may include audio data (e.g., event audio data). The data may include image data (e.g., event image data, event video data, combinations of event image data and event video data, etc.). The data may include data captured for a period of time after the occurrence of the event. For example, the event recording may comprise image and/or audio data captured until an input is detected indicating that the incident has concluded and/or the event recording should be stopped. The input may include an end capture signal. The data may be stored in permanent memory. The data may be stored in non-volatile memory. After the data is stored, the data may be provided by the recording device for subsequent review. For example, the data may be transmitted via network interface of the recording device to another computing device for further storage and playback via the other computing device. The data may be protected from being deleted, overwritten, erased, or otherwise rendered inaccessible in response to capture of additional data by the recording device. Accordingly, the event recording may provide data representing activity proximate the recording device after the occurrence of the incident.

In various embodiments, event data may be recorded in a manner different from pre-event data for the incident. For example, the event data may be stored in memory (e.g., memory 215 with brief reference to FIG. 2). The event data may be stored in a part of a memory of a recording device different from a part of the memory in which pre-event data may be buffered by the recording device. The event data may be stored for transmission from the recording device. Rather than being rendered inaccessible after a period of time, event audio data may be captured for the event recording until another signal is detected by the recording device. Accordingly, a period of time for which event data is recorded for an event recording on a recording device may be greater than a period of time for which pre-event data is recorded on the recording device for a pre-event recording.

In various embodiments, a recording device may begin capturing an event recording (step 640). The recording device may begin capturing the event recording similar to capturing an incident recording in step 510, with brief reference to FIG. 5. By capturing the event recording, the recording device may be configured to record information related to an incident. Particularly, the recording device may be configured to record information related to an incident after an occurrence of the incident. Capturing the event recording may include capturing the event recording instead of capturing a pre-event recording. Upon capturing the event recording, capture of a pre-event recording may be discontinued.

In various embodiments, capturing the event recording (step 640) may include beginning capture of event data for the event recording. The recording device may start capturing event data via one or more of an image capturing system and an audio capturing system. For example, processor 213 of recording device 210 may control image capturing system 220 to initiate capture of event image data and/or control audio capturing system 230 to initiate capture of event audio data with brief reference to FIG. 2. The event audio data may be captured via at least one microphone of audio capturing system 230 of recording device 210, with brief reference to FIG. 2. In embodiments, the recording device may continue capturing data for the event recording after previously capturing data for a pre-event recording. For example, processor 213 of recording device 210 may control image capturing system 220 to continue capture of image data and/or control audio capturing system 230 to continue capture of audio data, with brief reference to FIG. 2. Processor 213 may further store the data captured after beginning capture of the event recording as event data in memory 215. In embodiments, a microphone of audio capturing system 230 may continue capturing audio data both before and after beginning capture of the event recording by the recording device 210, though first audio data captured before beginning capture of the event recording may initially be buffered in memory 215 and second audio data captured after beginning capture of the event recording may be stored in memory 215.

In various embodiments, capturing the event recording (step 640) may include detecting a second initiate capture signal. The second initiate capture signal may comprise an event capture signal. The event capture signal may indicate an occurrence of an incident. The event capture signal may indicate that the recording device should be configured to capture and store data for the incident. The event capture signal may indicate that capturing event data for the event recording should begin. By detecting the event capture signal, the recording device may be automatically controlled to selectively capture an event recording. In accordance with the event capture signal, the recording device may begin capturing event data.

In various embodiments, detecting the event capture signal may be similar to detecting the initiate capture signal as discussed with respect to beginning capture step 510 with brief reference to FIG. 5. The event capture signal may include an input received via one or more of a user interface, a network interface, or other component of the recording device. The input may indicate an occurrence of an incident to the recording device. For example, the event capture signal may include one or more of a manual input received via user interface 240, a voice command received via audio capturing system 230, a predetermined sound (e.g., gunshot, sound trigger) received via audio capturing system 230, and a wireless transmission received via network interface 217 of recording device 210 with brief reference to FIG. 2. The wireless transmission may include a notification regarding a status of another device. For example, the notification may be included in a wireless transmission from a weapon, wherein the notification indicates that the weapon is unholstered, a safety of the weapon is deactivated, the weapon has been fired, or other status of the weapon. As a related example, and further in accordance with various embodiments, the notification may be received in a wireless signal from a sensor device mounted in a vehicle, wherein the notification indicates one or more of a door of the vehicle is open or closed, a light of the vehicle is activated or deactivated, a siren of the vehicle is activated or deactivated, a trunk of the vehicle is open or closed, or other status of a component of the vehicle. As a further example, the event capture signal may include a manual input for placing (e.g., setting, configuring) the recording device in an event mode, wherein the recording device was previously configured to begin capturing the event recording in response to the manual input.

In various embodiments, an event capture signal may be different from a pre-event capture signal. The pre-event capture signal may comprise a first input and the event capture signal may comprise a second input, different from the first input. The first input and the second input may be received via different components of a user interface or other component of the recording device. The first input and second input may comprise different user interactions with a component of the recording device. For example, a short press (e.g., <2 seconds) of a button of a user interface may be associated with a pre-event capture signal, while a long press (e.g., >2 seconds) may be associated with an event capture signal. The first and second inputs may comprise different sound inputs (e.g., predetermined sounds, voice commands, etc.) received via an audio capturing system of the recording device. One or more properties of a given input may indicate whether the input is associated with one of a pre-event capture signal and an event capture signal. Detecting an initiate capture signal may include processing, by a processor of the recording device, an input of initiate capture signal to determine the initiate capture signal comprises one of a pre-event capture signal and an event capture signal.

In various embodiments, a recording device may be configured to record communication audio data in one or more different manners upon beginning capture of an event recording. For example, a processor of the recording device may be configured to continue altering audio data, alter audio data for each additional communication, and cease altering communication audio data upon beginning capture of the event recording.

In various embodiments, a recording device may record communication audio data upon beginning capture of an event recording in different manners in accordance with different settings. The settings may be received by the recording device. The settings may comprise data indicative of one or more values. The settings may be stored in a memory of the recording device and a processor of the recording device may access the settings and perform operations in accordance with the settings. For example, recording device 210 may receive a setting via network interface 217 with brief reference to FIG. 2. The setting may be stored in memory 215. Processor 213 may access the setting from memory 215 and record communication audio data in accordance with the setting. For example, processor 213 may continue altering audio data in accordance with a first setting, alter audio data for each additional communication in accordance with a second setting, and cease altering communication audio data upon beginning capture of the event recording in accordance with a third setting. As a related example, and in various embodiments, the recording device may perform operations in accordance with one or more manners independent of whether one or more settings are received by the recording device. For example, the recording device may be configured to perform only a single manner of recording communication audio data upon beginning capture of an event recording. The single manner may be performed without need or reference to one or more settings as discussed for various embodiments of the present disclosure.

In various embodiments, a recording device may continue altering audio upon beginning capturing an event recording. Continuing altering the audio may enable a communication initiated before beginning capturing an event recording to continue to be protected from being stored in the event recording. However, the recording device may not enable an additional communication to be protected, thereby prioritizing capture of subsequent incident audio data for an incident after a first communication has ended. In embodiments according to various aspects of the present disclosure, continuing altering the audio may include altering audio as the recording is captured (step 650), detecting a communication ending signal (step 660), ceasing altering the audio (step 670), and then storing the event recoding (step 685).

In various embodiments, a recording device may alter audio as a recording is captured (step 650). The recording device may alter the audio similar to altering audio in step 630 and/or step 540, with brief reference to FIG. 5. The recording device may alter the audio responsive to a communication activation signal. The recording may include an event recording. Altering the audio may include altering audio data. Altering the audio may include continuing altering audio data captured before and after beginning capturing the event recording. The audio data may include event audio data captured for the event recording after beginning capturing the event recording. The event audio data may comprise communication audio data. Altering the event audio data may comprise one or more of a group comprising muting the event audio data, reducing a volume of the event audio data, distorting the event audio data, generating and outputting an anti-communication audio, and altering audio from the event audio data having a frequency in a voice frequency range. By altering audio as a recording is captured, the recording device may continue to provide privacy and protection to a communication initiated before beginning capturing an event recording. The communication audio data may be altered continuously before and after capturing the event recording by the recording device. Relative to altering audio at step 630, the altered event audio data may be directly stored in a memory, rather being buffered and potentially deleted. The event audio data may continue to be altered until a communication ending signal is detected by the recording device.

In various embodiments, a recording device may detect a communication ending signal (step 660). The recording device may detect the communication ending signal similar to detecting a communication ending signal in step 550, with brief reference to FIG. 5. The communication ending signal may indicate that communication may no longer occur (e.g., has ended). The communication ending signal may indicate that communication audio will not be further provided proximate the recording device and/or that communication audio will not be received by the recording device. The communication ending signal may comprise one or more of a wireless transmission, a voice command, an activation sound, or a user interface activation as discussed herein. The communication ending signal may be detected via one or more of a user interface device, a communication input, or an audio capturing system of a recording device. For example, the wireless communication may be detected via network interface 417 or communication input 449, the voice command and the activation sound may be detected via one of audio capturing system 430 or communication input 449, and the user interaction may be detected via user interface 440 of recording device 410 with brief reference to FIG. 4. In embodiments, the communication ending signal may be detected after one or more initiate capture signals are detected by recording device 410, including multiple initiate capture signals that cause a recording device to record the altered audio data in different manners. In response to the communication ending signal, the recording device may cease altering the event audio data.

In various embodiments, a recording device may cease altering the audio (step 670). The recording device may cease altering the audio similar to ceasing altering the audio in step 560, with brief reference to FIG. 5. Ceasing altering audio may include ceasing altering audio data captured for incident recording. The audio data may include event audio data and the incident recording may comprise an event recording. By ceasing altering the audio data, subsequent event audio data may be recorded in an event recording as originally captured. The altering may be ceased in accordance with the recording device detecting a communication ending signal. Ceasing altering the event audio data may include preserving event audio data as captured by an audio capturing system of the recording device. For example, the event audio data in an event recording may correspond to event audio data captured by a microphone of audio capturing system 230 of recording device with brief reference to FIG. 2. The microphone may continue capturing audio data the upon ceasing altering the audio. However, a processor of the recording device may discontinue altering the audio data. Ceasing altering audio may include providing, by the processor, unaltered event audio data. In various embodiments, ceasing altering the audio may be performed after at least a portion of event audio data is altered. Accordingly, a first portion of event audio data may comprise altered event audio data and a second portion of the event audio data may comprise unaltered event audio data. The first portion may be altered in accordance with altering the audio as the recording is captured at step 650. The second portion of the event audio data may be captured after ceasing altering audio at step 670.

In various embodiments, a recording device may continue capturing the event recording after ceasing altering the audio and store the event recording (step 685). Upon storing the event recording (step 685), additional event audio data may not be altered. Additional event audio data may be captured and stored for the event recording after ceasing the altering by which prior event audio data is altered. Storing the event recording after altering and ceasing altering the audio may be performed by the recording device in accordance with a first setting of the recording device. A processor of the recording device may be configured in accordance with the first setting to store the event recording after altering and ceasing altering the audio. Upon storing the event recording after altering and ceasing altering the audio, continuing altering the audio may be terminated.

In various embodiments, a recording device may alter audio data for one or more additional communications. By altering the audio data for each additional communication, additional communication audio data may be at least partially altered for each additional communication. Altering audio data for one or more additional communications may continue to protect each additional communication from being stored in the event recording. Communication audio may be protected independent of whether corresponding audio data is captured in audio data for a pre-event or an event recording. Communication audio be protected independent of an occurrence of an incident. Non-communication audio may be captured by the recording device between communications. However, privacy and security for each and/or all communication captured in audio data by the recording device may be preserved.

In embodiments according to various aspects of the present disclosure, altering the audio data for one or more additional communications may comprise detecting a second communication activation signal (step 680), altering the audio as the recording is captured (step 650), detecting a second communication ending signal (step 660), and ceasing altering the audio (step 670). Detecting the second communication activation signal may be similar to detecting a communication activation signal at step 620 and/or detecting a communication activation signal at step 520 with brief reference to FIG. 5. The second communication activation signal may be detected after beginning capture of an event recording. The second communication activation signal may be detected after event audio data is captured and altered for the event recording. In embodiments, altering the audio data for one or more additional communications may comprise receiving two or more second communication activation signals and altering a respective portion of the event audio data for each second communication activation signal. Altering the audio data for one or more additional communications may be performed by the recording device in accordance with a second setting of the recording device. A processor of the recording device may be configured, in accordance with the second setting, to alter the audio data for the one or more additional communications. The recording device may continue altering the event audio data until capture of audio data, including pre-event audio data and event audio data, is ended.

In various embodiments, a recording device may cease altering communication audio data upon beginning capture of the event recording. The audio may include event data captured concurrently and after beginning capturing the event recording. The audio may include all event audio data captured for the event recording. Ceasing altering the audio data upon beginning capture of the event recording may be performed by the recording device in accordance with a third setting of the recording device. A processor of the recording device may be configured in accordance with the third setting to cease altering the audio data upon beginning capture of the event recording by the recording device. Ceasing altering communication audio data upon beginning capture of the event recording may comprise ceasing altering the audio (step 675) and storing the event recording (step 685).

In various embodiments, a recording device may cease altering the audio (step 675). The recording device may cease altering the audio similar to ceasing altering the audio in step 670 and/or step 560, with brief reference to FIG. 5. Ceasing altering audio may include ceasing altering audio data captured for incident recording. The audio data may include event audio data and the incident recording may comprise an event recording. By ceasing altering the audio data, the event audio data may be recorded in an event recording as originally captured. The altering may be ceased (e.g., terminated, discontinued, etc.) in accordance with beginning capture of the event recording by the recording device. Ceasing altering the event audio data may include preserving event audio data as captured by an audio capturing system of the recording device. For example, the event audio data in an event recording may correspond to event audio data captured by a microphone of audio capturing system 230 of recording device with brief reference to FIG. 2. The microphone may continue capturing audio data the upon ceasing altering the audio. However, a processor of the recording device may discontinue altering the audio data. Ceasing altering audio may include providing, by the processor, unaltered event audio data. In various embodiments, ceasing altering the audio may be performed after beginning capture of the event recording by the recording device. Accordingly, all event audio data for an incident recording comprising the event recording may include unaltered event audio data. Ceasing altering the audio upon beginning capture of the event recording may enable a portion of communication initiated before beginning capturing an event recording to be protected from being stored in the event recording. However, the recording device may not enable an additional communication to be protected upon beginning capture of the event recording. By ceasing altering audio, incident event audio may be captured in full, thereby providing a more complete set of information regarding an incident, while still providing security and privacy for communication initiated before the event. After ceasing altering the audio, the recording device may continue capturing event audio for the event recording. The event audio may continue to be unaltered by the recording device in accordance with ceasing altering the audio (step 675).

In various embodiments, a recording device may store an event recording. The event recording may comprise event data. The event data include event audio data. The event data may include event image data. The event recording may be stored in non-volatile memory. For example, the event recording may be stored in memory (e.g., memory 215 with brief reference to FIG. 2). Storing the event recording may include receiving the event audio data from an audio capturing system (e.g., audio capturing system 230) and protecting the received event audio data from being deleted, overwritten, erased, or otherwise rendered inaccessible in response to capture of additional data by the recording device. In embodiments, all event audio data may comprise unaltered audio. In embodiments, event audio data may include altered and unaltered audio data. After the data is stored, the data may be provided by the recording device for subsequent review. For example, the data may be transmitted via network interface 417 of the recording device 410 to another computing device for further storage and playback via the other computing device, with brief reference to FIG. 4. In embodiments, the event recording may be continuously stored as additional event data is captured by the recording device.

In various embodiments, storing the event recording may include storing an incident recording (step 685). The incident recording may comprise the event recording and a pre-event recording. The pre-event recording may include pre-event data captured before the recording device began capture of the event recording. The pre-event data may include pre-event audio data. At least a portion of the pre-event audio data may comprise altered audio data in accordance with various aspects of the present disclosure. Storing the pre-event audio data may include copying the pre-event audio data from a first part of a memory and a storing the pre-event audio data in a second part of the memory. The pre-event audio data may be stored in the memory with the event audio data. In embodiments, storing the pre-event audio may include identifying the pre-event audio data buffered in the recording device and protecting the identified pre-event audio data from being deleted, overwritten, erased, or otherwise rendered inaccessible in response to capture of additional data by the recording device. By storing the incident recording, data regarding activity both before and after an occurrence of an incident may be saved for subsequent review.

In various embodiments, a recording device may end capturing of the recording (step 690). The recording device may end capturing of the recording similar to ending capturing of the recording in step 570, with brief reference to FIG. 5. Ending capture of the recording (step 690) may comprise ceasing capture of event data for the event recording. The recording device may stop capturing event data via one or more of an image capturing system and an audio capturing system. For example, processor 213 of recording device 210 may control image capturing system 220 to discontinue capture of event image data and/or control audio capturing system 230 to discontinue capture of event audio data with brief reference to FIG. 2. Additional data for an event recording may not be captured by the recording device after ending capture of the event recording. Data captured prior to ending capture of the event recording may be stored, deleted, transmitted and/or further processed as discussed elsewhere herein.

In various embodiments, ending the recording may include detect an end capture signal. The end capture signal may be received via a component of the recording device. For example, recording device 210 may receive the end capture signal via one or more of user interface 240, network interface 217, and audio capturing system 230 with brief reference to FIG. 2. The end capture signal may be further detected in accordance with processing performed by processor 213 of recording device 210. For example, processor 213 may process an input received via responsive to an input received via one or more of user interface 240, network interface 217, and audio capturing system 230 and detect the end capture signal based on the processing of the input. Upon ending capture of the event recording, method 601 may end.

In embodiments according to various aspects of the present disclosure, a recording device may transmit communication audio data after a communication activation signal is received at step 620, similar to transmitting step 530, with brief reference to FIG. 5. The recording device may transmit the communication audio data before one or more of detecting the communication ending signal at step 650 and/or ending capture of an event recording at step 690. For example, the communication audio data may be transmitted before, during, and/or after one or more of altering the pre-event audio at step 630, beginning capture of an event recording at step 640, altering the event audio at step 650, ceasing altering the event audio at step 675, and storing an event recording at step 685. As noted above, transmitting the communication audio data, further in combination with capturing data and/or altering data may enable the recording device to perform operations of both a communication device and a recording device, while ensuring the communication audio data is securely processed by the recording device during such operations.

In various embodiments, a recording device may be configured to perform one or more of the steps recited in regards to FIGS. 5-6 and/or steps of any other method or process disclosed herein. For example, one or more of recording device 210 and recording device 410 may be respectively configured to perform the one or more of the steps, with brief reference to FIGS. 2A-B and 4. Processor 213 of recording device 210 may execute computer-readable instructions stored in memory 215 to cause recording device to perform operations comprising the one or more steps. Alternately or additionally, and in accordance with various embodiments, processor 413 of recording device 410 may execute computer-readable instructions stored in memory 415 to cause processor 413 to perform operations comprising the one or more steps. The one or more steps may be performed via a processor of the recording device, further in combination with other components of the recording device as discussed elsewhere herein.

In various embodiments, aspects of the present disclosure may relate to dynamically creating and using communication channels amongst a plurality of remote electronic devices (e.g., communication devices, recording devices, etc.), wherein at least one device is assigned and/or associated with a first individual or location (e.g., first user 1, second user 3, third user 5, etc.) and a second device is associated with a different user or location (e.g., first user 1, second user 3, third user 5, etc.). In one embodiment, a first electronic device may be a body-worn camera assigned to a first law enforcement officer of a first division and a second device may be a body-worn camera assigned to a second law enforcement officer associated with the same or different division. Those skilled in the art will appreciate that the above examples are merely for illustrative purposes. In one embodiment, one or more of the devices within the plurality of devices is configured to selectively engage two-way communication with one or more of the other devices within the plurality of devices and/or other electronic devices. In one embodiment, the device comprises a user input mechanism which may be engaged to initiate communication. Example user input mechanisms include, but are not limited to: a button, switch, gesture-recognition system, touch screen, and/or combinations thereof. In certain embodiments, the communication capabilities may be triggered remotely, either by the user, such as by a mobile device interface, and/or from a third party or device.

In one embodiment, a first device amongst the plurality of devices may comprise a camera. In one such embodiment, the device may comprise a body-worn camera that is configured to be manually and/or remotely triggered to record one or more still or video images. In addition to enabling the capture of images (either as still and/or video images) with/or without audio, the device may be configured to provide two-way communication (e.g., audio, visual, audio-visual, etc.) between a user proximate to the camera and at least one other users, agencies, or remote locations associated with one or more other devices. In one embodiment in which the first device is a body-worn camera, the second device may be a multimedia device associated with a squad car of a second officer. In certain embodiments, activation (or a portion thereof) of the two-way communication channel between two or more of the devices may be independent of whether the device is capturing media (e.g. audio, visual, or audio-visual). For example, in one embodiment, a body-worn camera may be selectively utilized for capturing media of an incident unfolding in front of a first officer wearing the device and still may be utilized for two-way communication with at least one other remote device, such as by the user pressing a button or sliding a switch on the camera (amongst other options). In yet another embodiment, utilizing the device for a two-way communication channel may automatically trigger activating the device to record media (audio and/or visual) to capture the surroundings as the two-way communication occurs. In yet another embodiment, the camera selectively excludes, such as through noise cancellation and/or other technologies and techniques described herein, at least a portion of the two-way communication. In one embodiment, at least a portion of the audio of the two-way communication may be excluded or reduced in volume on a stored copy of the recorded media captured by the camera based on camera images of an audio pickup of the local environment. In one embodiment, at least two copies of the captured media is obtained. One copy may include the audio/video from the two-way communication channel, whereas a second copy may not include audio and/or video from the two-way communication (or a reduced volume or quality of the two-way communication).

In one embodiment, creating a communication channel amongst a plurality of devices within the plurality of devices may be based, at least partially, on a reported incidence, an ongoing incident, and artificial intelligence (AI) determined incident, and/or combinations thereof. In one implementation, a plurality of devices associated with different responders may be added to a unified channel. The channel may be formed to permit two-way communication between the users of the plurality of devices once established. In some embodiments, an electronic signal may be received from one of the devices to be added confirming acceptance to be added to the channel. In another embodiment, an electronic signal providing electronic information regarding at least one of the added devices may be received prior to establishing two-way communication with at least one of the devices. In one embodiment, the electronic signal may be received as a result of a user input, such as for example, a user of the device confirming establishment of the channel. In another embodiment, the electronic signal may be responsive to a determination that one or more quality-of service (QoS) parameters being met. For example, if a device is not capable of reliable communication, it may not be added to the channel. In another embodiment, a different device may be added in lieu of a device not meeting one or more parameters. The QoS parameter is merely an example, one or more other parameters or factors may be utilized in accordance with various embodiments. Other factors that may be utilized, directly or indirectly, include but are not limited to: geographic location, current use of the device (e.g., currently recording media), status of the user associated with the device (e.g., officer currently involved with another incident), power state (e.g., low battery, standby mode, off state, etc.), and combinations thereof.

In one embodiment, a first device amongst the plurality of devices comprises a body-worn camera configured to be worn by an officer. In one example, the officer may be handling a DUI (driving while intoxicated) incident. Based on the incident, which may be determined from one or more sources, a communication channel group may be dynamically formed. In various embodiments, the source(s) may include, but are not limited to: the officer's camera, one or more additional cameras, sensors, a manual user input by the officer and/or other persons (including remote users), sensor inputs, and/or a combination thereof. In one embodiment, a second device within the plurality of devices is associated with a resource having an alcohol-determining device (e.g., a mobile blood alcohol measuring device). In another embodiment, an electronic device associated with a user or agency having a tow-truck or a vehicle-removing capability may be added to the group. Depending on the embodiment, the plurality of different devices may be selected based on a specific profile associated with the incident or event (e.g., a need for 1 tow truck), and selected (either automatically and/or manually) from a specific responder/user associated with a specific electronic device. In another embodiment, one of a plurality of devices within a classification system may be selected. For example, several devices associated with tow-trucks may be chosen for possible inclusion within the group and exclusion/inclusion criteria may be utilized to select one or more (or reduce the potential candidates). In one embodiment, selection criteria may utilize geographic location, current and/or recent usage of the electronic device (e.g., active incident), rating based on past performance, and/or combinations thereof or other possible criteria. In one embodiment, a plurality of users associated with electronic devices that meet one or more selection criteria may be contacted for possible inclusion of one or more of their devices within the channel. The users may be contacted through the actual devices for possible inclusion and/or other devices.

In one embodiment, an electronic device is configured to have multiple groups or channels, which may be selectively toggled between. In one embodiment, a first group may be a precinct-wide group, the second group may be geographically based (e.g., a subset of precinct-controlled devices associated with active on-duty officers within a geographic range or area), a third group may be situationally-based, such as described above with respect to the DUI incident example. One or more groups may be user-selectable.

In certain embodiments, at least a portion of the two-way communication between the first device and another device is stored. In one embodiment, at least a portion of the communication is stored separately from a recording of audio/visual information of the local environment of the device. In one embodiment, a portion of the two-way communication is stored locally on the device. In another embodiment, it is transmitted to a remote location off of the device. In various embodiments, storage of portions of the two-way communication may be based, at least in part, on the state of the device. For example, in one embodiment, if the device is not currently capturing audio/visual information from the local environment, the two-way communication may be transmitted for storage on a remote device. In another embodiment, if the device is operating in a buffer mode (in which, for example, small portions of information are being recorded in a buffer, but not being currently marked for long-term storage), two-way communications (or a portion thereof) may be stored on a remote device as opposed to changing the state of the local device.

In certain embodiments, captured images of the local environment/situation may be analyzed based on the detection of the device being used to capture audio/visual information of the local environment/situation as well as the device being utilized for two-way communication. For example, if its determined that the electronic device is being used for two-way communication on a first channel, then image/audio data being captured to perform OCR on certain detected images. In embodiments, the images may be compared against a template to compare license plates or identification cards (driver's license). In one embodiment, the detection of plates, IDs, and/or characters thereon or other items may be based on not only the two-way communication being used but may require one or more criteria, such as the officer or third party to issue a command (verbally, electronic user input, and/or via a mechanical input mechanism). Either in combination with one or more of the above or other criteria or alone, the two-way communication and/or the captured audio/visual information captured from the local environment may be parsed to determine whether to analyze a portion thereof further. For example, based upon detecting a gun or weapon being drawn, used, or recognized, optical character recognition (OCR) may be performed to detect a license plate within captured images.

In certain embodiments, at least a portion of the two-way communication stream may be filtered out of a copy or livestream of the recorded data due to a determination that the electronic device is capturing data indicative that another person is speaking, and/or another event is occurring and/or would be expected to generate an audible signal.

In one embodiment one or more two-way communication channels may be designated private, and as such, audio and/or visual communications captured from remote sources may be removed from at least one stored copy of the captured media of the local events being captured by the electronic device and/or one or more other devices.

Figure 7:
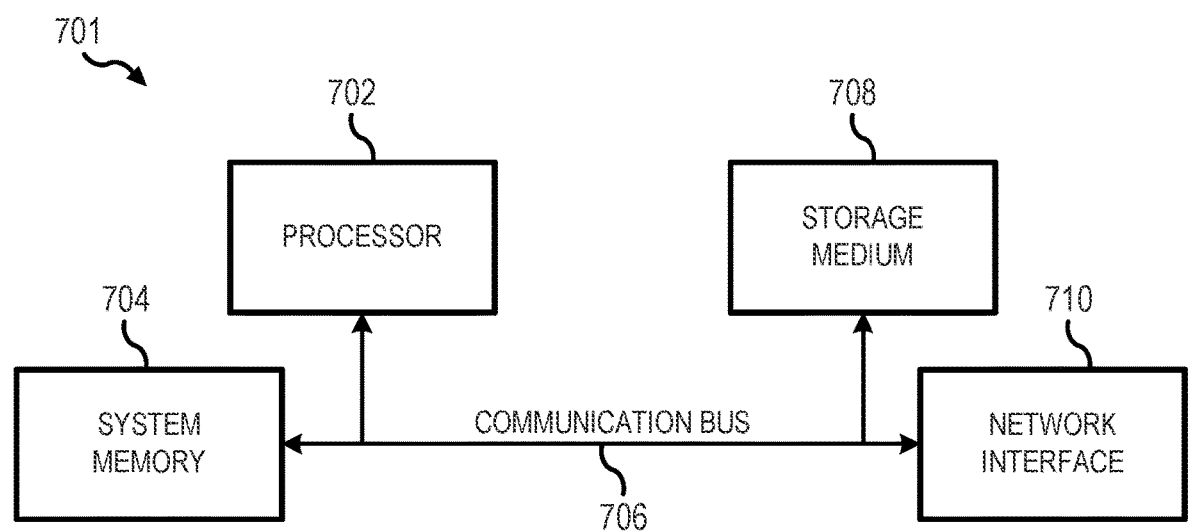
FIG. 7 is a block diagram illustrating components of a computer-based system, in accordance with various embodiments.

In various embodiments, and with reference to FIG. 7, an exemplary computer-based system 701 is disclosed. Computer-based system 701 may be appropriate for use in accordance with embodiments of the present disclosure. For example, in various embodiments according to various aspects of the present disclosure, computer based system 701 may respectively correspond to one or more of recording device 210, communications device 310, and recording device 410, with brief reference to FIGS. 2a-2b, 3, and 4. The accompanying description of computer-based system 701 may be applicable to servers, personal computers, mobile phones, smart phones, tablet computers, embedded computing devices, and other currently available or yet-to-be-developed devices that may be used in accordance with embodiments of the present disclosure.

Computer-based system 701 may include a processor 702 and a system memory 704 connected by a communication bus 706. Depending on the exact configuration and type of computer-based system, system memory 704 may be volatile or nonvolatile memory, such as read only memory ("ROM"), random access memory ("RAM"), EEPROM, flash memory, or other memory technology. Those of ordinary skill in the art and others will recognize that system memory 704 typically stores data and/or program modules that are immediately accessible to and/or currently being operated on by processor 702. In this regard, processor 702 may serve as a computational center of computer-based system 701 by supporting the execution of instructions. Processor 702 may comprise one or more processing units, as discussed further herein. System memory 704 may comprise one or more memory units, as discussed further herein.

Computer-based system 701 may include a network interface 710 comprising one or more components for communicating with other devices and systems over a network. Embodiments of the present disclosure may access basic services that utilize network interface 710 to perform communications using common network protocols. Network interface 710 may comprise a communications unit, as discussed further herein.

Computer-based system 701 may also include a storage medium 708. However, services may be accessed using a computer-based system that does not include means for persisting data to a local storage medium. Therefore, storage medium 708 depicted in FIG. 7 is optional. Storage medium 708 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 708 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 704 and storage medium 708 depicted in FIG. 7 are examples of computer-readable media.

For ease of illustration and because it is not important for an understanding of the claimed subject matter, FIG. 7 does not show some of the typical components of many computer-based systems. In this regard, computer-based system 701 may include input devices, such as a keyboard, keypad, mouse, trackball, microphone, video camera, touchpad, touchscreen, electronic pen, stylus, and/or any other input device described herein. Such input devices may be coupled to computer-based system 701 by wired or wireless connections including RF, infrared, serial, parallel, Bluetooth®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computer-based system 701 (e.g., a client device), or can be integral components of computer-based system 701. In some embodiments, multiple input devices may be combined into a single, multi-function input device (e.g., a video camera with an integrated microphone).

Computer-based system 701 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 701, or can be integral components of computer-based system 701. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory unit" as discussed herein may comprise any hardware, software, and/or database component capable of recording data. Recording data may include buffering data and/or recording data in a volatile memory. Recording data may include storing data and/or recording data in a non-volatile memory. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Any database discussed herein may include relational, hierarchical, graphical, distributed ledger, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A recording device comprising:
    an image capturing system configured to capture image data;
    an audio capturing system configured to capture audio data;
    a network interface;
    a tangible, non-transitory computer-readable storage medium; and
    a processor configured to operatively control the image capturing system, the audio capturing system, the network interface, and the tangible, non-transitory computer-readable storage medium to perform operations comprising:
        capturing the image data via the image capturing system;
        capturing the audio data via the audio capturing system;
        detecting a communication activation signal;
        responsive to detecting the communication activation signal, altering the audio data to at least partially alter communication audio data captured in the audio data after the communication activation signal is detected;
        recording the image data in the tangible, non-transitory computer-readable storage medium;
        recording the audio data comprising the at least partially altered communication audio data in the tangible, non-transitory computer-readable storage medium; and
        responsive to detecting the communication activation signal, transmitting the communication audio data via the network interface, wherein the transmitted communication audio data corresponds to the communication audio data as captured by the audio capturing system.

2. The recording device of claim 1, wherein the operations further comprise:
    detecting a communication ending signal, wherein the communication ending signal indicates that the communication audio data is not captured in the audio data after the communication ending signal is detected; and
    responsive to detecting the communication ending signal, ceasing altering the audio data and continuing to capture the audio data via the audio capturing system.

3. The recording device of claim 1, wherein altering the audio data comprises muting the audio data.

4. The recording device of claim 1, wherein altering the audio data comprises altering audio from the audio data having a frequency in a voice frequency range.

5. The recording device of claim 1, wherein the communication activation signal comprises at least one of a voice command or a user interface activation.

6. The recording device of claim 1, wherein the audio capturing system comprises a first microphone to capture the communication audio data, and wherein the first microphone is directed towards a mouth of a user on which the recording device is mounted.

7. The recording device of claim 6, wherein the audio capturing system comprises a second microphone angled or directed in a different direction relative to the first microphone to capture the audio data.

8. The recording device of claim 1, wherein detecting the communication activation signal comprises detecting the communication audio data is transmitted over a private channel.

9. The recording device of claim 8, wherein altering the audio data comprises muting the audio data.

10. The recording device of claim 9, wherein detecting the communication audio data is transmitted over the private channel comprises detecting a data packet of the communication activation signal that indicates the communication audio data is transmitted over the private channel.

11. A method performed by a body-worn camera, the method comprising:
    capturing, via an image capturing system of the body-worn camera, image data;
    capturing, via an audio capturing system of the body-worn camera, audio data;
    detecting, by a processor of the body-worn camera, a communication activation signal;
    responsive to detecting the communication activation signal, altering the audio data to at least partially alter communication audio data captured in the audio data after the communication activation signal is detected, wherein altering the audio data comprises applying one or more transformations to the audio data;
    recording the image data in a tangible, non-transitory computer-readable storage medium of the body-worn camera;
    recording the audio data comprising the at least partially altered communication audio data in the tangible, non-transitory computer-readable storage medium; and
    responsive to detecting the communication activation signal, transmitting the communication audio data via a wireless network interface of the body-worn camera, wherein the one or more transformations are not applied to the communication audio data that is transmitted.

12. The method of claim 11, wherein:
    altering the audio data comprises muting the audio data; and
    recording the audio data comprises recording the muted audio data.

13. The method of claim 11, wherein:
    detecting the communication activation signal comprises detecting the communication audio data is transmitted over a private channel; and
    altering the audio data comprises altering the audio data responsive to detecting the communication audio data is transmitted over the private channel.

14. The method of claim 11, further comprising:
    detecting, by the processor, an event capture signal;

responsive to detecting the event capture signal, ceasing, by the processor, altering the audio data captured by the audio capturing system to provide event audio data comprising a portion of the communication audio data to which the one or more transformations are not applied; and storing, in the tangible, non-transitory computer-readable storage medium, the event audio data comprising the portion of the communication audio data to which the one or more transformations are not applied.

15. The method of claim 14, wherein recording the audio data comprises:
responsive to detecting the event capture signal, storing a second portion of the audio data comprising the at least partially altered communication audio data in the tangible, non-transitory computer-readable storage medium, wherein the second portion of the audio data is captured by the audio capturing system prior to detecting the event capture signal.

16. A body-worn camera comprising:
an image capturing system configured to capture image data;
one or more microphones;
a tangible, non-transitory computer-readable storage medium; and
a processor configured to operatively control the image capturing system, the one or more microphones, and the tangible, non-transitory computer-readable storage medium, wherein the processor is configured to perform operations comprising:
capturing a pre-event recording comprising pre-event audio data and the image data, wherein the pre-event audio data is captured via the one or more microphones;
detecting a communication activation signal;
after the communication activation signal is detected, capturing communication audio data in the pre-event audio data via the one or more microphones;
responsive to detecting the communication activation signal, altering the pre-event audio data of the pre-event recording to at least partially alter the communication audio data captured in the pre-event audio data; and
temporarily buffering and then discarding an older portion of the altered pre-event audio data of the pre-event recording, wherein the older portion of the pre-event audio data is temporarily buffered in the tangible, non-transitory computer-readable storage medium.

17. The body-worn camera of claim 16, wherein the operations further comprise:
after capturing the pre-event recording, capturing an event recording comprising event audio data, wherein the event audio data is captured via the one or more microphones; and
storing the event recording in the tangible, non-transitory computer-readable storage medium, wherein the event recording includes the event audio data and a most recently captured portion of the altered pre-event audio data of the pre-event recording.

18. The body-worn camera of claim 16, wherein the operations further comprise:
detecting, by the processor, a communication ending signal after capturing the pre-event recording; and
responsive to detecting the communication ending signal, ceasing, by the processor, altering the pre-event audio data.

19. The body-worn camera of claim 16, wherein the operations further comprise:
detecting an event capture signal;
responsive to detecting the event capture signal, ceasing altering audio data captured by the one or more microphones to provide unaltered event audio data for an event recording; and
storing the event recording in the tangible, non-transitory computer-readable storage medium, wherein the event recording comprises the unaltered event audio data.

20. The body-worn camera of claim 16, further comprising a wireless network interface, wherein:
altering the pre-event audio data comprises applying one or more transformations to the communication audio data captured in the pre-event audio data; and
responsive to detecting the communication activation signal, transmitting the communication audio data via the wireless network interface, wherein the one or more transformations are not applied to the transmitted communication audio data.

21. The body-worn camera of claim 20, wherein transmitting the communication audio data comprises:
transmitting a copy of the pre-event audio data separate from the pre-event recording; or
transmitting the pre-event audio data prior to altering the pre-event audio data of the pre-event recording.

22. The body-worn camera of claim 16, wherein altering the pre-event audio data comprises:
determining a first portion of the communication audio data is transmitted over a private channel in accordance with the communication activation signal comprising a data packet with a first value;
responsive to determining the first portion of the communication audio data is transmitted over the private channel, altering a first portion of the pre-event audio data to at least partially alter the first portion of the communication audio data; and
recording, in the tangible, non-transitory computer-readable storage medium, the first portion of the pre-event audio data comprising the altered first portion of the communication audio data captured in the first portion of the pre-event audio data.

23. The body-worn camera of claim 22, further comprising:
detecting a second communication activation signal comprising a second data packet with a second value different from the first value, the second value indicating that a second portion of the communication audio data is transmitted over a public channel;
determining the second portion of the communication audio data is transmitted over the public channel in accordance with the second value; and
recording, in the tangible, non-transitory computer-readable storage medium, a second portion of the pre-event audio data comprising the second portion of the communication audio data, wherein the second portion of the communication audio data is preserved as initially captured by the body-worn camera in accordance with determining the second portion of the communication audio data is transmitted over the public channel.

24. The body-worn camera of claim 16, wherein capturing the pre-event recording comprises:
capturing a first portion of the pre-event audio data prior to detecting the communication activation signal, wherein the first portion comprises the pre-event audio data; and capturing a second portion of the pre-event audio data after detecting the communication activation signal, wherein the second portion comprises the communication audio data; and wherein altering the pre-event audio data comprises altering the second portion of the pre-event audio data and preserving the first portion of the pre-event audio data.

25. The body-worn camera of claim 16, wherein detecting the communication activation signal comprises receiving the communication activation signal from a communication device separate from the body-worn camera.

\* \* \* \* \*